US012056885B2

United States Patent
Wang et al.

(10) Patent No.: US 12,056,885 B2
(45) Date of Patent: Aug. 6, 2024

(54) METHOD FOR AUTOMATICALLY GENERATING HAND MARKING DATA AND CALCULATING BONE LENGTH

(71) Applicant: HTC Corporation, Taoyuan (TW)

(72) Inventors: Bo Wang, Taoyuan (TW); Tianyuan Sun, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/072,408

(22) Filed: Oct. 16, 2020

(65) Prior Publication Data

US 2021/0124917 A1 Apr. 29, 2021

(30) Foreign Application Priority Data

Oct. 18, 2019 (CN) .......................... 201910993410.3

(51) Int. Cl.
*G06T 7/55* (2017.01)
*G06T 7/00* (2017.01)
(Continued)

(52) U.S. Cl.
CPC .................. *G06T 7/55* (2017.01); *G06T 7/60* (2013.01); *G06T 7/70* (2017.01); *G06T 7/80* (2017.01);
(Continued)

(58) Field of Classification Search
CPC ........... G06K 9/00375; G06K 9/00208; G06K 9/00355; G06K 9/00389; G06K 9/209;
(Continued)

(56) References Cited

U.S. PATENT DOCUMENTS 6,819,782 B1 * 11/2004 Imagawa .................. G06T 7/74
382/218
8,723,789 B1 * 5/2014 Rafii ....................... G06F 3/017
345/158
(Continued)

FOREIGN PATENT DOCUMENTS

| CN | 103714322 A | 4/2014 |
| CN | 109854893 A | 6/2019 |

OTHER PUBLICATIONS

Office Action issued in CN application No. 201910993436.8; dated Apr. 11, 2024; 5 pages.

*Primary Examiner* — Jin Cheng Wang
(74) *Attorney, Agent, or Firm* — Meunier Carlin & Curfman LLC

(57) ABSTRACT

The present disclosure relates to a method for automatically generating labeled data of a hand, comprising: acquiring at least three images to be processed of the hand under different angles of view; detecting key points on the at least three images to be processed respectively; screening the detected key points by using an association relation among the at least three images to be processed, the association relation being the same frame of image of the at least three images to be processed from the hand under different angles of view; reconstructing a three-dimensional space representation of the hand with regard to the key points screened on the same frame of image, in combination with a given finger bone length; projecting the key points on the three-dimensional representation of the hand onto the at least three images to be processed; and generating the labeled data of the hand on the images to be processed by using the projected key points on the at least three images to be processed.

18 Claims, 19 Drawing Sheets

(51) Int. Cl.
  *G06T 7/60* (2017.01)
  *G06T 7/70* (2017.01)
  *G06T 7/80* (2017.01)
  *G06T 17/00* (2006.01)
  *G06V 10/46* (2022.01)
  *G06V 10/764* (2022.01)
  *G06V 20/64* (2022.01)
  *G06V 40/10* (2022.01)
  *G06V 40/20* (2022.01)

(52) U.S. Cl.
  CPC ............... *G06T 7/97* (2017.01); *G06T 17/00* (2013.01); *G06V 10/462* (2022.01); *G06V 10/764* (2022.01); *G06V 20/647* (2022.01); *G06V 40/113* (2022.01); *G06V 40/28* (2022.01); *G06T 2207/30196* (2013.01)

(58) Field of Classification Search
  CPC ............... G06K 9/4671; G06K 9/6271; G06K 9/00362; G06T 17/00; G06T 2207/30196; G06T 7/60; G06T 7/70; G06T 7/80; G06T 7/97; G06T 19/006; G06F 3/017; G06F 3/0304
  See application file for complete search history.

(56) References Cited

U.S. PATENT DOCUMENTS

| | | | |
|---|---|---|---|
| 8,854,433 B1* | 10/2014 | Rafii | G06F 3/011 |
| | | | 348/42 |
| 10,706,584 B1* | 7/2020 | Ye | G06F 18/214 |
| 10,803,616 B1* | 10/2020 | Twigg | G06F 3/012 |
| 11,232,591 B1* | 1/2022 | Twigg | G06F 3/013 |
| 2013/0265218 A1* | 10/2013 | Moscarillo | G06F 3/0416 |
| | | | 345/156 |
| 2014/0010407 A1* | 1/2014 | Sinha | G06V 20/10 |
| | | | 382/103 |
| 2019/0026984 A1* | 1/2019 | Arnone | G07F 17/3262 |
| 2019/0107894 A1* | 4/2019 | Hebbalaguppe | G06F 3/011 |
| 2019/0139297 A1* | 5/2019 | Chen | G06F 18/22 |
| 2019/0180473 A1* | 6/2019 | Guleryuz | G06K 9/00362 |
| 2019/0278983 A1* | 9/2019 | Iqbal | G06N 3/08 |
| 2020/0106966 A1* | 4/2020 | Youngquist | G06T 7/557 |
| 2020/0126256 A1* | 4/2020 | Sinha | G06V 10/757 |
| 2020/0226786 A1* | 7/2020 | Fitzgibbon | G06N 5/003 |
| 2020/0372246 A1* | 11/2020 | Chidananda | G06V 10/454 |
| 2020/0372672 A1* | 11/2020 | Schonberger | G06T 7/74 |
| 2021/0081104 A1* | 3/2021 | Chung | G06F 3/0426 |
| 2021/0165997 A1* | 6/2021 | Cai | G06V 20/647 |

* cited by examiner

METHOD FOR AUTOMATICALLY GENERATING HAND MARKING DATA AND CALCULATING BONE LENGTH

TECHNICAL FIELD

The present disclosure generally relates to collection of hand image data and automatic generation of labeled data, and, more especially, to a method for automatically generating labeled data of a hand and a method for calculating a bone length.

BACKGROUND

In virtual reality (VR) and augmented reality (AR) technologies, gesture input is one of the main technologies used for three-dimensional human-machine interaction input, and has a broad prospect of application. Three-dimensional interaction tasks and technologies such as grasping and releasing objects, flying, and roaming in a virtual environment are realized by hand. Previously, it is human touch or operation and the response from computer that are used to obtain the means based on human-computer interaction, which is generally achieved by using hardware devices, such as VR controller, space ball, 6D joystick, and 6D mouse. However, human-machine interaction can also be enabled via computer by observing a user's motion in a non-contact manner (e.g. a camera), and this is a novel three-dimensional interaction technology whereby the intention of the user is understood by means of gesture recognition.

Therefore, in the scene of using gesture input, one of the key factors which determines whether gesture input can be popularized is how to accurately recognize and distinguish the gestures made by a user, especially to distinguish the gestures at varying degrees of precision (e.g. in a very refined manner).

At present, a research direction of gesture recognition is to use deep learning technology under the framework of artificial neural network. Using a camera to collect images, and using a deep learning model to enable the detection and tracking of hand key points, as well as gesture recognition, together constitute a more efficient and precise method. In order to improve the usability of a recognition system, it is necessary to provide a well-trained deep network model.

In the recognition process based on machine learning, especially deep learning, there is the necessity to provide a large number of sample images with correct training labels to train the deep machine learning model in order to improve the accuracy rate of recognition. Meanwhile, the training samples should be as extensive as possible, and the sample images provided for training should take into account the differences in illumination, the surrounding environment of hand, age, race, skin color and other factors, as well as the universality of hand type, gesture and motion. Currently, in order to produce correctly labeled sample images, the method adopted is to put in great human labor to manually label key points of a hand in a variety of images taken by an image pick-up device.

However, for the purpose of providing numerous training sample images, the method of manual labelling is troublesome and laborious.

The contents in the Background are merely the technologies known by the discloser, instead of surely representing the prior art in the field.

SUMMARY OF THE INVENTION

One of the aims of the technical solutions described in the present disclosure is to provide a solution of collecting hand image data and automatically generating labeled data.

The present disclosure provides a method for automatically generating labeled data of a hand, comprising: acquiring at least three images to be processed of the hand under different angles of view; detecting key points on the at least three images to be processed respectively; screening the detected key points by using an association relation among the at least three images to be processed, the association relation being the same frame of image of the at least three images to be processed from the hand under different angles of view; reconstructing a three-dimensional space representation of the hand with regard to the key points screened on the same frame of image, in combination with a given finger bone length; projecting the key points on the three-dimensional representation of the hand onto the at least three images to be processed; and generating the labeled data of the hand on the images to be processed by using the projected key points on the at least three images to be processed.

The present disclosure also provides a system for automatically generating labeled data of a hand, comprising: an image capture system comprising a camera set configured to acquire at least three images to be processed for the hand under different angles of view; a labeling device configured to carry out the following operations: detecting key points on the at least three images to be processed respectively; screening the detected key points by using an association relation among the at least three images to be processed, the association relation being the same frame of image of the at least three images to be processed from the hand under different angles of view; reconstructing a three-dimensional space representation of the hand with regard to the key points screened on the same frame of image, in combination with a given finger bone length; projecting the key points on the three-dimensional representation of the hand onto the at least three images to be processed; and generating the labeled data of the hand on the images to be processed by using the projected key points on the at least three images to be processed.

The present disclosure also provides a method for calculating a finger bone length, comprising: acquiring at least two images of a hand in a frame of image under different angles of view; performing gesture recognition for the hand by using the at least two images under different angles of view; performing detection of key points on each hand image in at least two images respectively in the case that the recognized gesture is a predefined simple gesture; reconstructing a three-dimensional representation of the hand by using the detected key points; and calculating the finger bone length of the hand according to the three-dimensional key points on the reconstructed three-dimensional representation of the hand.

The present disclosure also provides a device for calculating a finger bone length, comprising: an acquisition device for acquiring at least two images of a hand in a frame of image under different angles of view; a recognition device for performing gesture recognition for the hand by using the at least two images under different angles of view; a detection device for performing detection of key points on each hand image in at least two images respectively in the case that the recognized gesture is a predefined simple gesture; a reconstruction device for reconstructing a three-dimensional representation of the hand by using the detected key points; and a calculation device for calculating the finger bone length of the hand according to the three-dimensional key points on the reconstructed three-dimensional representation of the hand.

The present disclosure also provides a system for calculating a finger bone length, comprising: an image capture system comprising a camera set configured to acquire at least two images of a hand in a frame of image under different angles of view; and a finger bone length calculation device configured to carry out the following operations: performing gesture recognition for the hand by using the at least two images under different angles of view; performing detection of key points on each hand image in at least two images respectively in the case that the recognized gesture is a predefined simple gesture; reconstructing a three-dimensional representation of the hand by using the detected key points; and calculating the finger bone length of the hand according to the three-dimensional key points on the reconstructed three-dimensional representation of the hand.

The present disclosure also provides a method for calculating a gesture bounding box, comprising: acquiring positions of a plurality of three-dimensional key points in a three-dimensional representation of a hand, the three-dimensional representation of the hand reconstructed according to at least two two-dimensional images of the hand; generating an auxiliary geometric structure associated with each key point according to the category of each key point in the plurality of three-dimensional key points; generating for each auxiliary geometric structure a set of auxiliary points on the surface of each auxiliary geometric structure; projecting the auxiliary points onto the at least two two-dimensional images; and acquiring edge nodes at the top, bottom, leftmost and rightmost in the projection of the auxiliary points on the at least two two-dimensional images, and generating the gesture bounding box based on the four nodes.

The present disclosure also provides a device for calculating a gesture bounding box, comprising: an acquisition device for acquiring positions of a plurality of three-dimensional key points in a three-dimensional representation of a hand, the three-dimensional representation of the hand reconstructed according to at least two two-dimensional images of the hand; an auxiliary geometric structure generation device for generating an auxiliary geometric structure associated with each key point according to the category of each key point in the plurality of three-dimensional key points; an auxiliary point generation device for generating for each auxiliary geometric structure a set of auxiliary points on the surface of each auxiliary geometric structure; a projection device for projecting the auxiliary points onto the at least two two-dimensional images; and a bounding box generation device for acquiring edge nodes at the top, bottom, leftmost and rightmost in the projection of the auxiliary points on the at least two two-dimensional images, and generating the gesture bounding box based on the four nodes.

The present disclosure also provides a system for calculating a gesture bounding box, comprising: an image capture system comprising a camera set configured to acquire at least two images of a hand in a frame of image under different angles of view; and a gesture bounding box calculation device configured to carry out the following operations: acquiring positions of a plurality of three-dimensional key points in a three-dimensional representation of a hand, the three-dimensional representation of the hand reconstructed according to at least two two-dimensional images; generating an auxiliary geometric structure associated with each key point according to the category of each key point in the plurality of three-dimensional key points; generating for each auxiliary geometric structure a set of auxiliary points on the surface of each auxiliary geometric structure; and projecting the auxiliary points onto the at least two two-dimensional images; acquiring edge nodes at the top, bottom, leftmost and rightmost in the projection of the auxiliary points on the at least two two-dimensional images, and generating the gesture bounding box based on the four nodes.

The advantage of the present disclosure lies in that it can provide for a deep learning model a large number of training samples with accurate label, from different subjects and under various environments. According to the present disclosure, hand image data that meet the above requirements can be quickly generated.

BRIEF DESCRIPTION OF THE DRAWINGS

The accompanying drawings, as part of the present disclosure, are provided for the purpose of further understanding of the present disclosure, and the schematic embodiments and description serve to illustrate the present disclosure, neither of which should make any improper limitation of the present disclosure. In the drawings.

DETAILED DESCRIPTION OF THE EMBODIMENTS OF THE INVENTION

Figure 1:
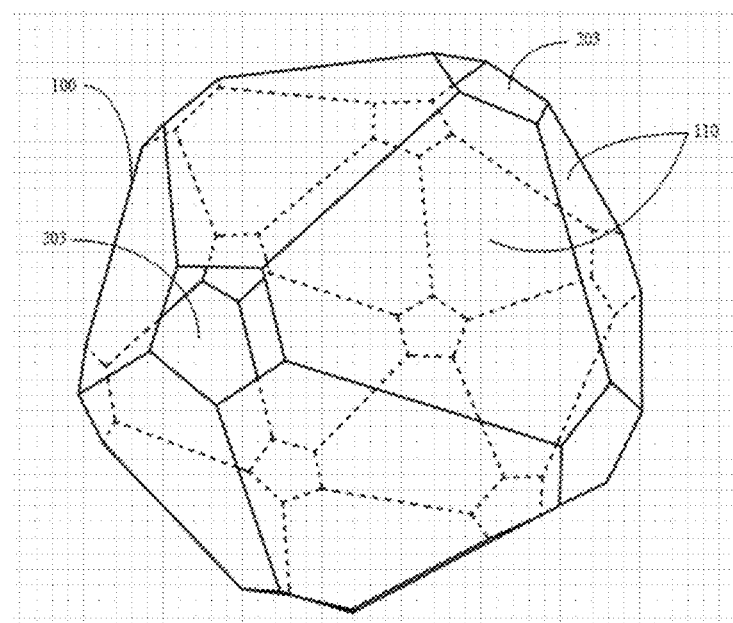
FIG. 1 schematically shows a structural diagram of a camera support framework for an image labelling system according to one embodiment of the present invention.

Certain exemplary examples will be described below only in a brief manner. Just as those skilled in the art will appreciate, changes in various ways to the examples described herein can be carried out without departing from the spirit or scope of the present disclosure. Therefore, the drawings and the following description are deemed essentially exemplary, instead of limitative.

The flow charts and block diagrams in the drawings illustrate possible architectures, functions and operations of the devices, methods and computer program products according to various embodiments of the present invention. In this regard, each block in a flow chart or block diagram may represent a part of a module, program segment, or code, which contains one or more executable instructions for implementing a predetermined logical function. It should be noted that in some alternative implementations, the functions marked in the blocks may also take place in a different order from those marked in the drawings. For example, two consecutive blocks can actually be executed in parallel, or sometimes in a reverse order, which depends on the function involved. It should also be noted that each block in the block diagrams and/or flow charts, and a combination of the blocks in the block diagrams and/or flow charts, can be implemented by a dedicated hardware-based system that performs some specified function or operation, or by a combination of dedicated hardware and computer instructions.

In the description of the present disclosure, it need be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and only used for the purpose of facilitating description for the present disclosure and simplification of the description, instead of indicating or suggesting that the denoted devices or elements must be specifically oriented, or configured or operated in some specific orientation. Thus, such terms should not be construed to limit the present disclosure. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present disclosure, "more" means two or above, unless otherwise defined explicitly and specifically.

In the description of the present disclosure, it need be specified that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, it may cover the direction contact between the first and second features, also cover the contact via another feature therebetween, instead of the direct contact. Furthermore, if a first feature "above", "over" or "on the top of" a second one, it may cover that the first feature is right above or on the inclined top of the second feature, or just indicate that the first feature has a horizontal height higher than that of the second feature. If a first feature is "below", "under" or "on the bottom of" a second feature, it may cover that the first feature is right below and on the inclined bottom of the second feature, or just indicates that the first feature has a horizontal height lower than that of the second feature.

The disclosure below provides many different embodiments and examples for achieving different structures described herein. In order to simplify the disclosure herein, the following will give the description of the parts and arrangements embodied in specific examples. Surely, they are just for the exemplary purpose, not intended to limit the present disclosure. Besides, the present disclosure may repeat a reference number and/or reference letter in different examples, and such repeat is for the purpose of simplification and clarity, and itself denotes none of the relations among various embodiments and/or arrangements as discussed. In addition, the present disclosure provides examples for a variety of specific techniques and materials, but the common skilled persons in the art are aware of an application of other techniques and/or a use of other materials.

The following description, along with the accompanying drawings, sets forth the specific examples of the present disclosure. It should be understood that the preferable examples described herein are only for the purpose of illustrating and explaining, instead of limiting, the present disclosure.

The embodiments of the present disclosure aim to provide for a deep learning model a large number of training sample images, which are correctly labeled, from different subjects and under various environments. According to the present disclosure, hand image data that meet the above requirements can be quickly generated.

In the embodiments of the present disclosure, data to be processed (or image data to be processed) refers to the video or continuous images taken by camera from different angles of view on the same target object. In order to obtain images from different angles of view, the number of cameras used to do so may be one or more. In the case of one camera, the target object is kept still and the position of the camera is changed. For example, the camera can be moved around the target object to take images at multiple angles and thereby complete the shooting of images from different angles of view. A frame of image is a collection of images taken by one or more cameras from different angles of view for the same pose of the same target object. By taking multiple cameras as an example, an image of the target object taken by each camera at one moment is called a subframe or a subframe of image. And the collection of images taken at one moment by the plurality of cameras from different angles for the target object constitutes a frame of image. In addition, those skilled in the art can understand that images taken by camera may be image data or images captured from a video stream.

According to the embodiments of the present disclosure, labeled data can be automatically generated for the aforesaid data to be processed. In the present disclosure, the labelling includes one or more combinations of the following: recognizing a bounding box of the target object; recognizing 2D key points (e.g. joint points of the wrist and fingers) on the images; pose type (e.g. gesture type, such as "five", "fist", "thumbs-up", etc.); 3D key points (e.g. the three-dimensional coordinate positions of key points) and pose of the target object (pose of the palm, fingers and other body parts, i.e., angle orientation, etc.).

A target object may be, for example, a hand (or a human hand) or a finger. The pose of the target object may be a gesture, for example. In the embodiments of the present invention, key points may be associated with characteristics of the target object, such as physiological joints (e.g. various joints of the fingers) and/or other specified regions in the hand (e.g. the palm). The labeled data of the present disclosure may be of a variety of types, which will be described below.

In the following text, a human hand is used as an example only, but it should be understood that the various embodiments described herein can also be applied to the case of other suitable target objects. At the same time, in the following text, joints of the hand are taken as an example only, but it should be understood that the various embodiments described herein can also be applied to the case of other suitable features of the target object.

Capture of Data to be Processed

Referring to FIG. 1, it shows a schematic diagram of a physical structure for a camera support framework 100 according to one embodiment of the present disclosure. As shown in FIG. 1, the camera support framework 100 is a stereoscopic structure formed by a plurality of support boards 110, wherein one or more holes 203 on the periphery of the camera support framework are formed at a position where the adjacent support boards 110 are spliced. The support board 110 shown in FIG. 1 is a hexagonal structure, wherein the hexagonal support board 110 is merely an embodiment, and the support board 110 may also be a structure of other polygons.

Figure 2:
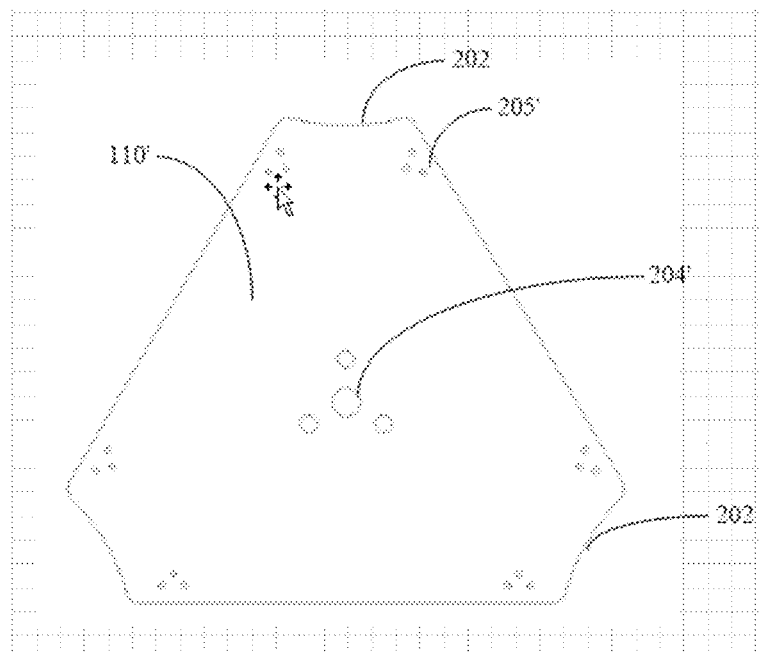
FIG. 2 schematically shows a schematic diagram of a support board for constructing a camera support framework according to one embodiment of the present invention.

FIG. 2 shows a schematic diagram of a support board 110' for constructing a camera support framework according to another embodiment of the present disclosure. The camera support framework is substantially a regular icosahedron constructed of twenty support boards 110'. The support board 110' is substantially a regular triangle, and an area near the vertex is removed at each corner, thereby leaving a notch 202. In this way, at the time of constructing the camera support framework, the positions of these notches will be spliced with the adjacent notches to form the holes 203 on the periphery of the camera support framework. The substantially central position of the support board 110' may be provided with a mounting hole set 204' for mounting the cameras thereon. The edge position of each corner of the support board 110' can be provided with a splicing hole set 205' for convenient splicing with other support boards to construct the camera support framework.

Herein, the camera support framework equipped with a camera is also called an image capture system.

In the embodiments shown in FIGS. 1 and 2, the basic shape of a support board that constitutes each face of the camera support framework in a regular icosahedron is a regular triangle, the side of which is 60 cm, for example, and holes may be provided at the twelve vertices of the regular icosahedron as an entrance for an arm at the time of data acquisition, for example. The regular icosahedron is simple in structure and can ensure the stability of the supporting structure. The cameras may be mounted on each plane and oriented toward the center.

Further, the present disclosure also provides an image labelling system, comprising: a camera support framework 100 for forming a peripheral framework; preferably, at least two cameras 120 mounted on at least two boards of these support boards, wherein each camera can be under wireless or wired operation by a control device to start and begin shooting simultaneously; and a labeling device configured to receive two or more images to be processed taken by the at least two cameras, and to label the hand in the image data to be processed. During the acquisition of image data, the hand of a tester can be reached inside the camera support framework 100 through any hole 203 on the camera support framework. Thereafter, the camera 120 mounted on the camera support framework can shoot various motions of the tester's hand from different angles of view to obtain one or more frames of image. In this way, the captured data contains the hand image data from a first-person angle of view, so that there is no possibility that the gestures of the tester at a third-person angle of view are blocked by the body of the tester. In addition, when the camera support framework is formed in a regular icosahedron, this makes the camera support framework approximately spherical. In the circumstance that the cameras are disposed on all faces, the target object can be completely covered at every angle for acquisition.

According to the embodiments of the present invention, the labeling device is used to label the same frame of image taken by different cameras from different angles of view for the same pose of the hand. For example, the labelling device can automatically synchronize, segment and label multi-angle-of-view images from different cameras. The recognition of the same frame of image by the labelling device and the specific labelling method will be discussed below.

In one example, the labelling device can store the received image data locally or on a local or networked server, and the labelling device can also be used as a control device that allows various cameras to start and begin shooting simultaneously so as to help the labeling device to recognize each subframe synchronized on various cameras. In addition, time value can be included in the image data taken by each camera, so that the synchronous subframe on each camera can be recognized by comparing the time value in the image data taken by each camera, and the time value can also be used for splicing or merging into one frame data.

In one example, the image labelling system may also comprise a control center (not shown) and a storage device (not shown). The control center is connected to the cameras in a wired or wireless way and controls all cameras and environmental control equipment (a light source, television, projector, etc.) to control the environment outside the support framework. The storage device is connected with the control center, the labelling device and/or the cameras to store image (including video) data taken by the cameras. The labelling device is connected with the cameras and the control center, and can automatically synchronize, segment and label the images.

Further, the image labelling system may also comprise a mobile platform for supporting the movement of the image capture system. For example, the mobile platform may be a dolly that can carry the image capture system and move. In one example, the mobile platform is a two-layer rolling cart, and the camera support framework is mounted on the upper layer. And the lower layer is for placing the labelling device and optional hardware devices such as the control center and the storage device. Therefore, the image capture system is small and movable, and can be easily used both indoors and outdoors.

With regard to the camera support framework, it should be understood that triangle is the most basic stable supporting shape. The basic shape of the support board and the stereoscopic construction of the camera support framework, as shown in FIGS. 1 and 2, are illustrative only. However, the inventor has also envisaged other possible shapes, for example, the support board may be a kit constructed by shapes selected from squares with different sizes, triangles with different sizes and pentagons with different sizes, and the camera support framework may be constructed into other polyhedral structures, such as a cube (including six faces), and football-like icosidodecahedron (including 12 hexagons and 20 pentagons)). In addition, as the case may be, an edge region beyond the vertex of each support board can also be provided with a notch, so that there is no need to form a continuous transitional surface at the joint face when two support boards are spliced into the camera support framework.

The shape, number and size of the mounting hole set 204 can be determined according to the installation requirements for matched cameras, and the same or different sets of mounting holes may be disposed on each face of the camera support framework. The mounting hole set 204 can facilitate the rapid disassembly and assembly of the cameras. It should be understood that these cameras may or may not be provided in the same type and configuration. The cameras of different types can be installed on some or all of the faces of the camera support framework, which are used to take images of the target object placed in the camera support framework at different angles of view. According to needs, different types of cameras may be employed, including a network camera, mobile phone, monitoring camera, professional camera, etc. The cameras can be fixed to any panel of the camera support framework by any feasible connection way (e.g. through the mounting hole set).

In one example, when being mounted on a panel of the camera support framework, the cameras can be parallel to the panel and substantially in the center of the panel. In the examples shown in FIGS. 1 and 2, the basic shape of each panel is a regular triangle 60 cm on each side, and when the cameras are arranged on all faces of the icosahedron, all cameras can cover a space in the center of the camera support framework, the space having a radius of about 25 cm. The focal length of the camera lens may be set into the radius of the camera support framework to obtain the optimal image quality.

In one example, the material of the support board assembly may be a transparent plexiglass board. Using transparent materials, the image of the target object taken by the cameras can contain the surrounding background that penetrates through the support board located behind the target object, which includes different indoor and outdoor environments and different lighting conditions where the image capture system is located. Thus, it can be convenient to record suitable background information and control the lighting effect.

In order to make the collected images have different lighting effects, different types of light sources can be used according to actual needs, such as point light source (i.e. an incandescent lamp), surface light source, etc. The light source can change the color and position during shooting or recording so as to form different types of ambient lighting effects. The light source may be controlled by the aforesaid labelling device and/or control center, or the light source may be set up in addition to the support board assembly. Similarly, since transparent materials may be selected as the material for the support board assembly, it could be easy to adjust or use different light sources outside the support board assembly.

In one example, various opaque materials or specific images may be pasted on the inner side of the support board assembly to simulate different backgrounds. For example, a support board assembly directly opposite to a camera lens may be covered with a black screen, so that images of the target object taken by the camera have a black background. In one example, the background may also be otherwise erected outside the support board assembly and be adjusted or replaced at any time.

Figure 3:
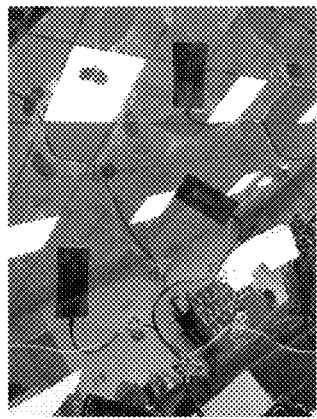
FIGS. 3(a), 3(b) and 3(c) each schematically show an external environment where the image labelling system according to one embodiment of the present invention is located.
Figure 3:
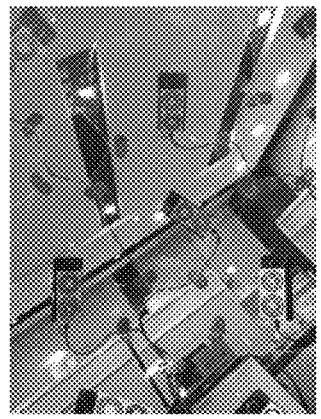
Figure 3:
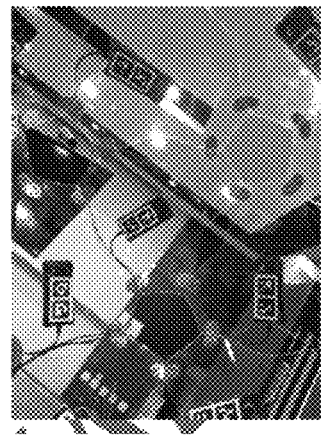

In addition, according to the embodiments of the present invention, continuous images or a video can be taken or recorded in different environments. FIGS. 3(*a*), 3(*b*) and 3(*c*) each show a schematic diagram of an external environment where the image capture system is located. FIG. 3(*a*) shows an office area scenario, FIG. 3(*b*) shows a storage area scenario, and FIG. 3(*c*) shows a conference room scenario. In addition, the external background or environment where the image capture system is located can be easily controlled by using a background control device such as television and projector.

It should be understood that the labelling device may be arranged locally together with the camera support framework, or the labelling device may also be networked and connected with the camera support framework or cameras through one or more networks, including but not limited to mobile phone network, wireless local area network (LAN), Bluetooth personal local area network, Ethernet LAN, token ring LAN, wide area network, Internet, etc. The connection between the labelling device and the cameras may be wired or wireless.

The image collection device according to the embodiments of the present invention has the following advantages:

(1) the device is small and movable, and can be easily assembled and disassembled;

(2) the device can be used outdoors;

(3) the backgrounds of the generated images are natural and diverse, and variable illumination and background can be achieved;

(4) for hand data collection, data at the first-person angle of view can be obtained, and there are no such circumstances as that the tester's body blocks the gesture in the collected image data;

(5) different types of cameras may be used together, for example, RGB cameras and depth cameras may be used at the same time, and the cameras may be quickly replaced; and (6) the collection covers all angles, which are nearly spherical in whole.

It should be understood that the capture system constructed above for data to be processed is not restrictive, but exemplary, and the various processing methods of the present disclosure described below are not limited only to use thereof for processing data captured by the capture system as constructed above for data to be processed, but can also be used for processing data captured by other appropriate capture systems. In other words, no limitation is made of the source of data to be processed at the time of employing the processing methods described herein.

Types of Labeled Data

According to the embodiments of the present disclosure, labeled data can be automatically generated for a hand image taken at multiple angles of view or a hand image extracted from a hand video at multiple angles of view, the hand image or video being taken at multiple angles of view using, for example, the aforesaid image capture system. The labeled data of the present disclosure may be provided in a variety of types, and the types of the labeled data according to the embodiments of the present disclosure will be described below.

Figure 4A:
FIGS. 4(a), 4(b), 4(c) and 4(d) each schematically show a schematic diagram of different types of labeled data according to one embodiment of the present invention.

In one embodiment, the labeled data may be a bounding box of a hand. The bounding box is a tool for labelling the range of a target object, which mostly represents with a rectangle the range of a target object in a two-dimensional image. For example, the rectangle shown in FIG. 4(a) is a bounding box automatically generated for the hand in the picture according to the embodiment.

Figure 4B:
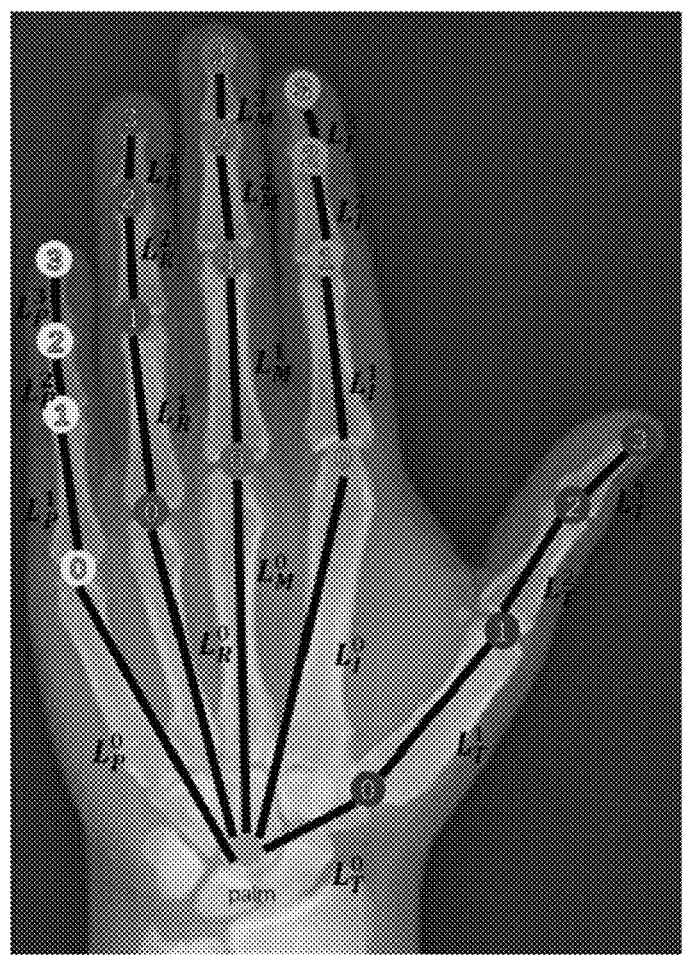

In one embodiment, the labeled data may be a two-dimensional key point of a hand in a two-dimensional image. As shown in FIG. 4(b), in this embodiment, the joint points at the wrist and fingers are defined as key points in the task of gesture recognition, and each hand corresponds to 21 key points. These 21 keys include four key points (fingertips and three joint points) of each finger and one key point at the base of the palm, i.e., at the wrist. The data of these key points can be used to label or reproduce any motion of the hand in subsequent applications.

Figure 4C:
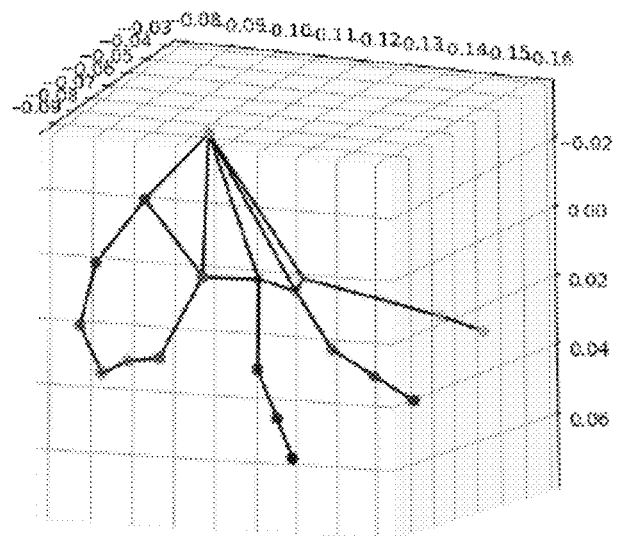

In one embodiment, the labeled data may be a three-dimensional key point of a hand, which is calculated out based on a plurality of associated two-dimensional images. As shown in FIG. 4(c), in this embodiment, the joint points at the wrist and fingers are defined as key points in the task of gesture recognition, and each hand corresponds to 21 key points. According to the corresponding 21 key points in a plurality of associated two-dimensional images, their three-dimensional positions in the world coordinate system and the pose of the palm, fingers and other body parts, i.e., angle orientation, are calculated. For example, a plurality of associated two-dimensional images may be a photos (i.e. a frame of image) taken for the same pose of the hand by a plurality of cameras from different angles of view, e.g., taken at the same time, or may also be photos taken for the hand at the same angle at successive moments.

Figure 4D:
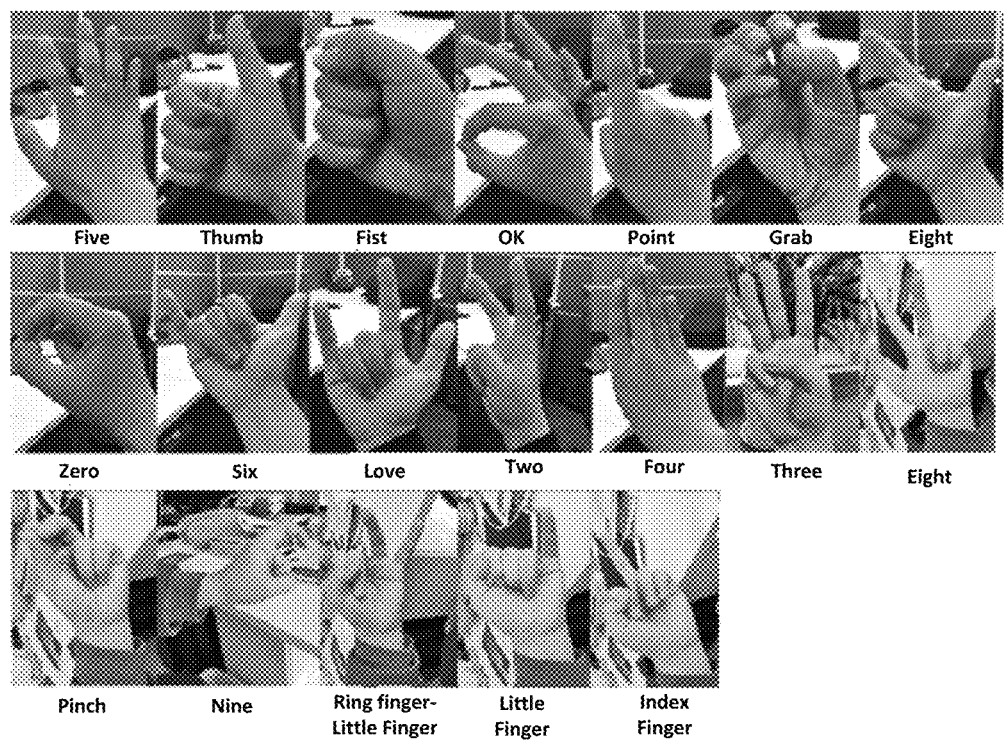

In one embodiment, the labeled data may be a recognition result of some predetermined gesture type. As shown in FIG. 4(d), in this embodiment, the gesture in the image data, which can be automatically labelled, includes 19 types of gestures such as "five", "fist" and "thumbs-up".

In one embodiment, the labeled data may include a hand bone length. As shown in FIG. 4(b), the hand bone length is a length between two adjacent key points on the hand. The hand bone length does not change when the hand is moving. Therefore, the labelling results can be counted and a bone length between joints of the tester's hand can be obtained with 4 segments per finger, a total of 20 segments.

Described above are examples of possible labeled data according to the embodiments of the present disclosure, including: hand bounding box, hand two-dimensional key points, gesture type, hand three-dimensional key point, gesture type (pose of hand), and hand bone length. In subsequent applications, these types of labeled data can be used alone or in combination. In a further example, the labeled data may also be the pose of some specific part of the hand, such as the pose of the palm and the pose of several specific fingers.

It should be understood that although the joint points of the hand are set as an example herein to explain the key points of the hand, those skilled in the art should understand that the embodiments of the present disclosure are not limited to the joint points of the hand, and other positions of the hand that can be used to represent gesture can also be regarded as the key points of the hand, such as the pose of the palm, the pose of some fingers and the palm.

Automatic Generation of Labeled Data (i.e. an Example of Using a Finger Length to Assist in Calculating a Three-Dimensional Spatial Position)

Figure 5A:
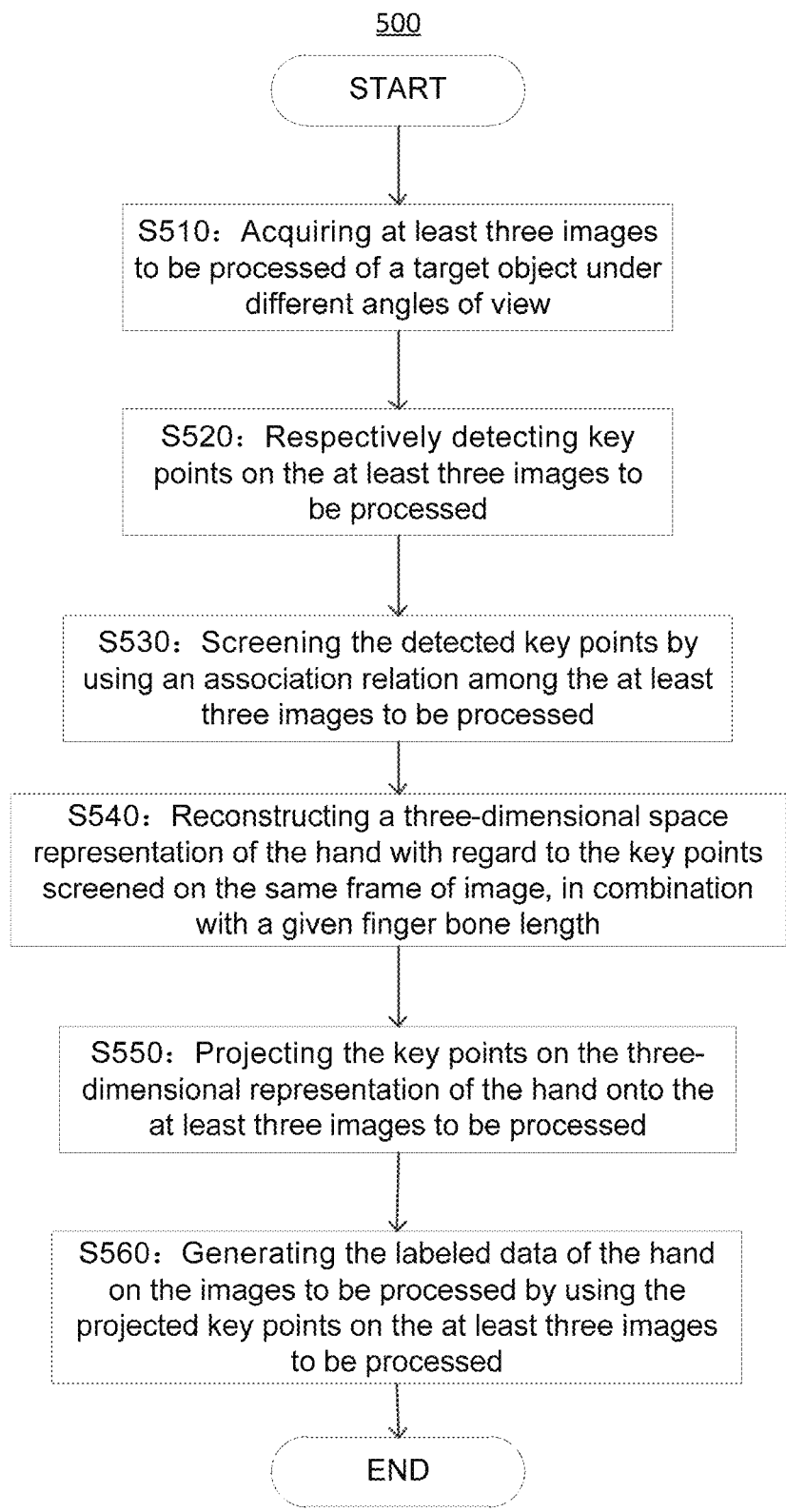
FIG. 5A schematically shows a flow chart of a method for automatically generating labeled data according to one embodiment of the present invention.

FIG. 5A schematically shows a flow chart of a method 500 for automatically generating labeled data according to one embodiment of the present disclosure. For example, the method can be executed at the labelling device of the image labelling system described above. The detailed description will be made below with reference to the drawings.

In step S510, at least three images to be processed of a target object under different angles of view are acquired. The target object is a hand, such as the hand of a tester.

Figure 5B:
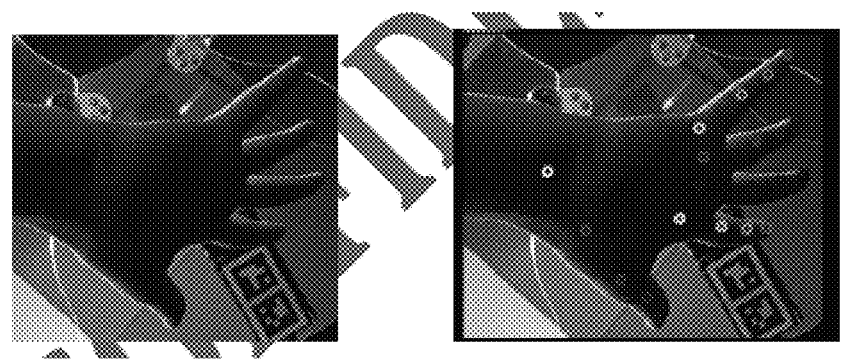
FIG. 5B schematically shows a schematic diagram of detection of two-dimensional key points of a hand according to one embodiment of the present invention.

In step S520, key points on the at least three images to be processed are detected respectively. The key points can be detected by using the principles of computer vision and image recognition. The key points may be, for example, joint points at the wrist and the fingers, or other predefined feature points that can represent the pose of the hand. For a static image, a neural network model can be used to detect the two-dimensional key points of each image. FIG. 5B shows a schematic diagram of detection of two-dimensional key points according to one embodiment of the present invention. In this drawing, the key points of the hand detected in the hand image in the left figure are shown as in the right one.

In step S530, the detected key points are screened by using an association relation among the at least three images to be processed. For example, the at least three images to be processed may belong to the same frame of image of the same target object under different angles of view, which means that they are different subframes of image. Or, the at least three images to be processed need to be recognized, from which at least two subframes of image of the same target object under different angles of view are found out.

An example is cited below to illustrate the screening process. For example, with regard to a hand key point, supposed that 20 cameras all have captured the key point, this suggests that the key point and its coordinates are recognized in all 20 subframes of image. However, in the actual recognition process, the coordinates of the key point in each subframe of image may not be completely consistent, in which the confidence or reliability of the coordinates of the key point is higher in some subframes of image, while the confidence or reliability of the coordinates of the key point is lower in some subframes of image. The process of screening is to screen those subframes with higher confidence or reliability.

As stated above, due to the errors and mistakes in the detection of each key point on the two-dimensional image in respect of each subframe of image, it is necessary to screen out appropriate two-dimensional key points to perform three-dimensional reconstruction of the position of the target object in the three-dimensional space. That is to say, for the each three-dimensional spacial key point, some are selected from the projection key points on the plurality of two-dimensional images corresponding to the three-dimensional spacial key point, to fit the three-dimensional key point. For example, coupling between random data can be used to carry out the screening, and specifically the random sample consensus (RANSAC) algorithm can be adopted to screen key points. RANSAC is a random algorithm, and this algorithm can find a maximum set randomly, in which the two-dimensional key points have higher reliability.

In step S540, a three-dimensional space representation of the hand is reconstructed with regard to the key points screened on the same frame of image, in combination with a given finger bone length. The finger bone length, such as the length data between each joint of the finger, may be obtained from a user input, or from user data, or also from recognition and calculation based on image data. In the present disclosure, in the process of reconstructing the three-dimensional spatial position of the hand, the precision and accuracy of the three-dimensional reconstruction of the hand can be significantly improved not only on the basis of the data of the screened key points but also in combination with the data on the finger bone length of the user.

Under the condition of a given finger bone length, a parametric model can be established for the hand. When the wrist position, spatial rotation and the angle of each finger joint are given, the position of the three-dimensional joint point can be determined. Then the problem about reconstruction of the three-dimensional key point is changed into the determination of hand parameters. Through the screened two-dimensional key points, all parameters of the hand model can be calculated out by the optimization method. Once the parameters are obtained, the spatial position of the three-dimensional key points can be obtained.

In step S550, the key points on the three-dimensional representation of the hand are projected onto the at least three images to be processed.

In step S560, the labeled data of the hand on the images to be processed is generated by using the projected key points on the at least three images to be processed.

Figure 5C:
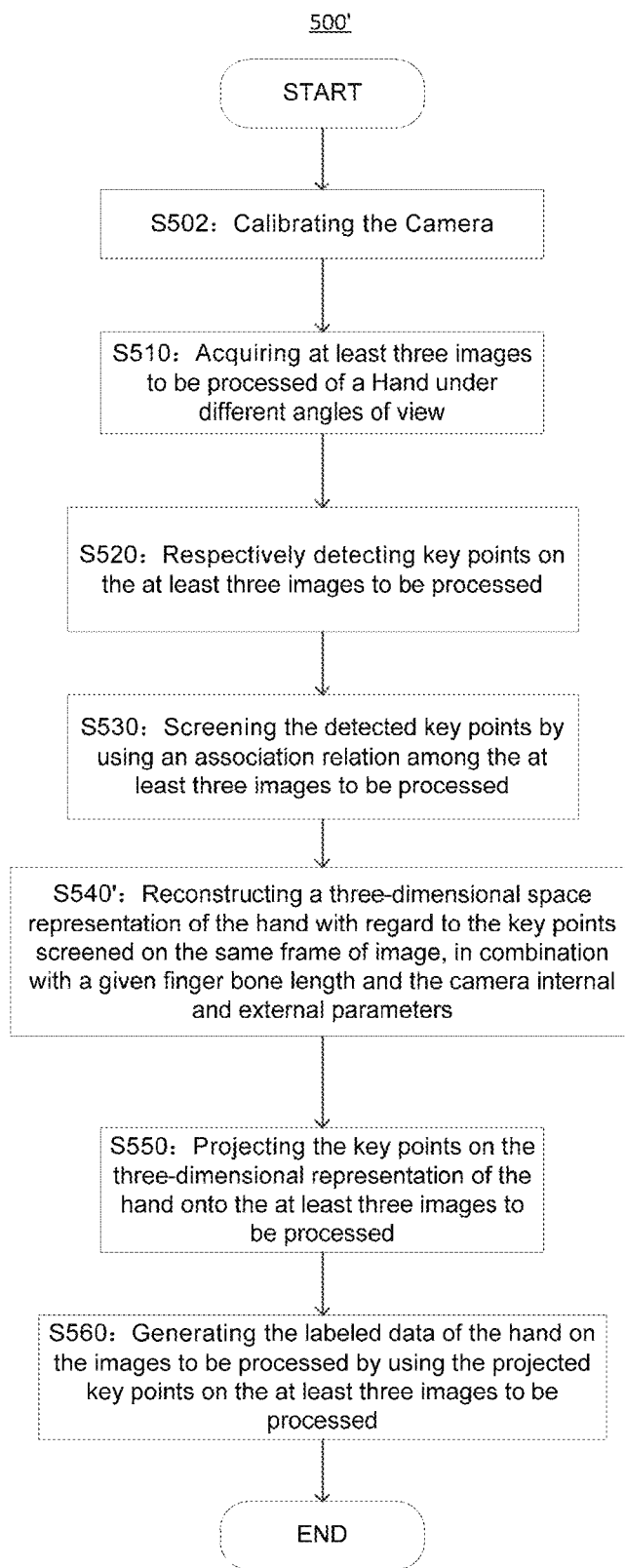
FIG. 5C schematically shows a flow chart of a method for automatically generating labeled data according to one embodiment of the present invention.

FIG. 5C illustrates a schematic diagram of a method 500' for automatically generating labeled data according to another embodiment of the present disclosure. Prior to step S510 in the method shown in FIG. 5A, this method also comprises step S502 of calibrating the camera set and calculating out camera internal and external parameters. The aforesaid at least three images to be processed of the target object, i.e. the hand, under different angles of view are taken by the camera set.

Steps S510, S520, S530 and S550 in the method 500' are the same as the corresponding steps S510, S520, S530 and S550 in the aforesaid method 500, and no more description will be made here. In the exemplary method 500', step S540' corresponds to step S540 in the aforesaid method 500, but the three-dimensional representation of the hand is reconstructed therein according to the screened key points on the same frame of image, in combination with the given finger bone length, and the camera internal and external parameters.

Recognition of the Same Frame of Image

In the embodiments of the present disclosure, the image data to be processed is a video stream or image sequence of image data under different angles of view, and various methods can be employed to recognize the same frame of image from the video stream or image sequence, namely, the image at different angles of view for the same motion (i.e. the gesture, for example, at the same moment) of the target object (a user's hand).

Images collected by a plurality of cameras at the same time can be obtained by means of synchronization of the cameras. Through synchronization among the plurality of cameras and video splitting, the same frame of image can be obtained from the images at different angles of view. Some cameras have the function of hardware synchronization, also known as external triggering; namely, the shutter is activated to record images at the time of receiving an external signal. During video splitting, an image can be extracted directly according to the recording frame rate. For cameras without the hardware synchronization, such as mobile phones and network cameras, then soft synchronization can be adopted. In this embodiment, an external flash is used as a synchronization signal. A light source that can be observed by all cameras may be arranged in the image capture system (or collection system), and the light source is controlled by the circuit to flash regularly or with the change of gesture. After the video recording is completed, all images that capture the flash in the video will be automatically detected, and the videos recorded by different cameras can be aligned and synchronized based on these detected flash frames. The cameras may also be synchronized using hardware. Moreover, additionally and optionally, when there are two types of cameras in the system, all cameras that support hardware synchronization can be synchronized using hardware and serve as a time series to perform software synchronization with other cameras.

In one embodiment, each camera can be controlled to start at the same time by the control center in the image labelling system mentioned above, and each camera is configured in the same manner, so that the video stream or image sequence of image data under different angles of view is synchronized right at the beginning, from which the same frame of image can be easily recognized.

In one embodiment, the plurality of cameras are arranged around the target object, such as a hand, for taking a video and continuous images for the target object. By an external device, the starting action of the plurality of cameras can be completed at the same time, so that the video or continuous images taken by the cameras is synchronized in time; namely, each frame of video image at the same time in each video displays an image of the target object (hand) at the same time in the real testing environment.

In one embodiment, the plurality of cameras are arranged around the target object, such as a hand, for taking a video and continuous images for the target object. After the plurality of imaging devices are started simultaneously or asynchronously, a random flash can be introduced into the shooting environment, for example, so that each imaging device can complete the synchronization of the cameras based on the flash recognized in their respective captured videos, and the time when the flash appears can be marked as the relative zero time in each video. In one embodiment, the flash in the video captured by each imaging device may also be recognized by a subsequent video processing device, system or software to complete the synchronization of the cameras.

In one embodiment, a shooting environment established by the plurality of cameras can be used to shoot a video or image for the target object, such as a hand, in the shooting environment. For example, when it is detected that the tester reaches out his/her hand into the shooting environment and he/she is prompted to make different gestures and constantly change the direction and position of the wrist, each camera can start and shoot in response to a flash after the change in gesture. These flashes can be used as a basis for recognizing the same frame of image under different angles of view. After the collection of the shooting data is completed, the video is first divided into pictures according to the synchronization mode of the cameras and according to a time interval. A group of pictures collected by different cameras at the same time is hereinafter referred to as "frame". Namely, each frame contains images taken by a plurality of cameras from different angles at the same moment.

Exemplary Calculation of a Finger Bone Length

The inventor has envisaged that many existing methods for calculating a finger bone length can be used to calculate a finger bone length, including direct calculation with all data, X-ray measurement and manual calibration.

Figure 6A:
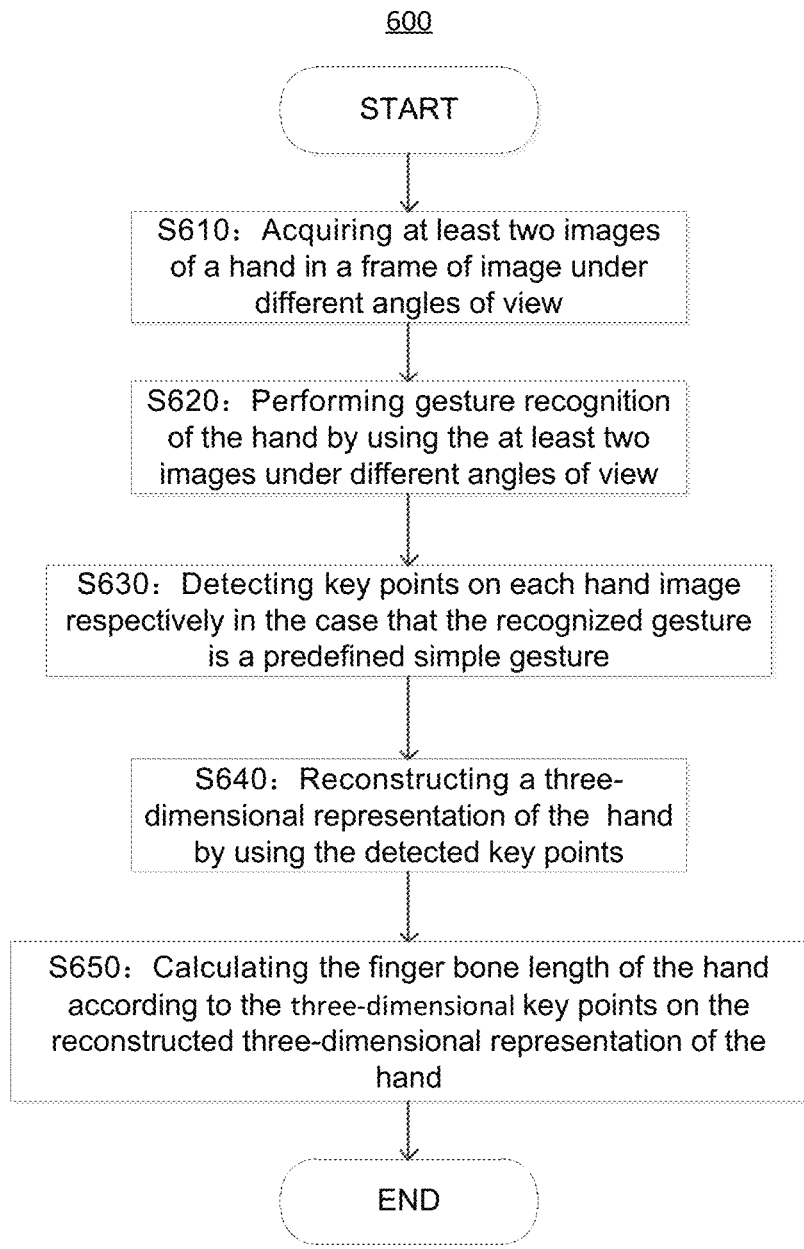
FIG. 6A schematically shows a flow chart of a method for calculating a finger bone length according to one embodiment of the present invention.

FIG. 6A illustrates a schematic diagram of a method 600 for calculating a finger bone length according to one embodiment of the present disclosure. The method 600 may be executed at the labelling device of the image labelling system described above. The detailed description will be made below with reference to the drawings.

In step S610, at least two images of a target object in a frame of image under different angles of view are acquired, wherein the target object may be a hand of a tester.

In step S620, gesture recognition of the hand of the tester is performed by using the at least two images under different angles of view.

In step S630, key points are detected on each hand image respectively in the case that the recognized gesture is a predefined simple gesture. According to the embodiment of the present invention, the predefined simple gesture refers to a gesture with the least coverage (blocking) between fingers, for example, the gesture types like "five" and "grap" as shown in FIG. 4 (d). "Five" and "grap" are two types of gestures showing the highest accuracy rate of gesture recognition, which can be used to obtain more accurate initial results.

In step S640, a three-dimensional representation of the target object, i.e., the hand, is reconstructed by using the detected key points. For a simple gesture, if each key point on the same frame of image is independent, the restriction of the finger length may not be considered.

In step S650, the finger bone length of the hand of the tester is calculated according to the key points on the reconstructed three-dimensional representation of the hand.

Figure 6B:
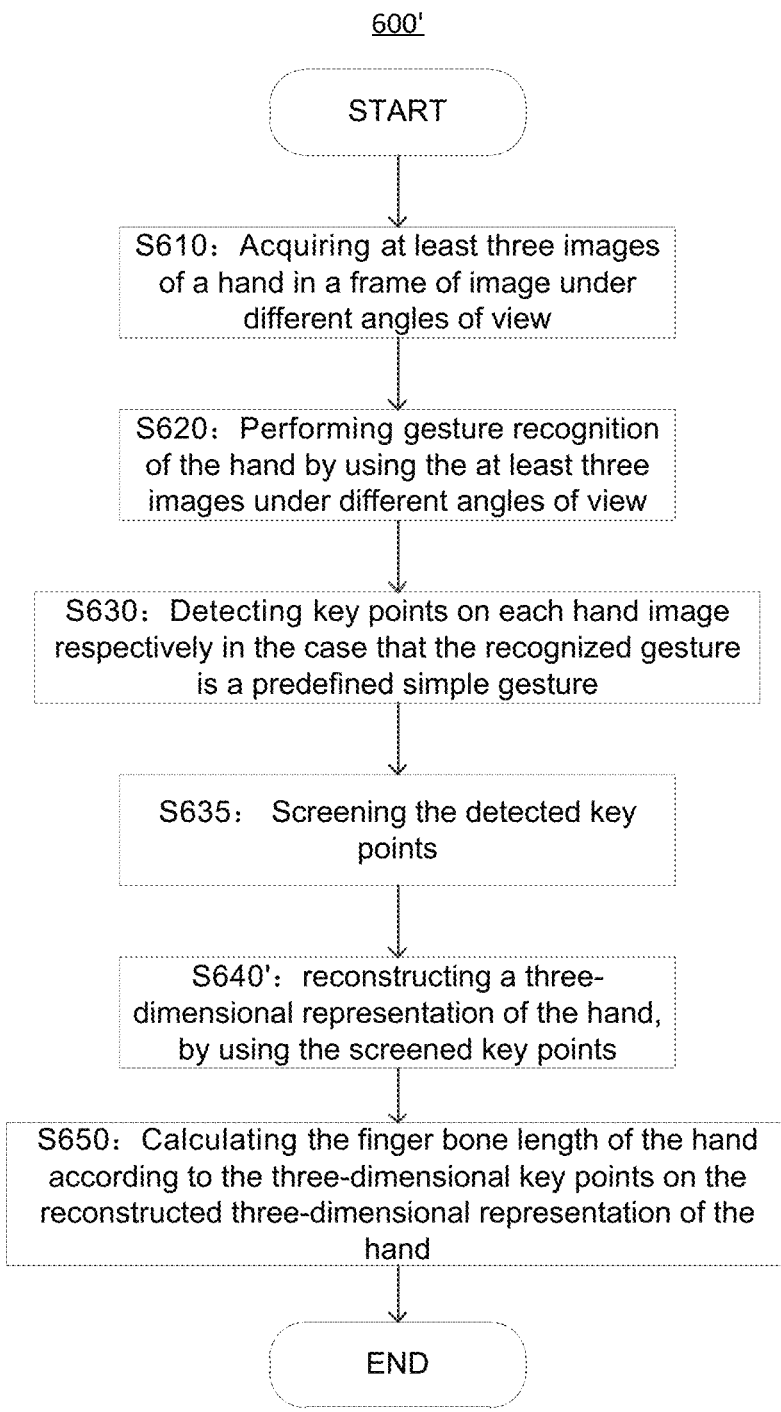
FIG. 6B schematically shows a flow chart of a method for calculating a finger bone length according to one embodiment of the present invention.

FIG. 6B illustrates a schematic diagram of a method 600' for calculating a finger bone length according to another embodiment of the present disclosure. The differences from the method 600 shown in FIG. 6A lie in that the method 600' comprises acquiring and using at least three images in a frame of image of the target object under different angles of view, and further comprises a step S635. In step S635: the detected key points are screened by using an association relation between the at least three images. Accordingly, errors can be reduced in the initial detection results. The association relation is based on the fact that the at least three images are different subframes of image of the same frame of image. Then, a step S640' in the method 600' corresponding to the step S640 in method 600 comprises: reconstructing a three-dimensional representation of the target object, i.e. the hand, by using the screened key points. For a simple gesture, if each key point on the same frame of image is independent, the restriction of the finger length may not be considered. Then, with the screened two-dimensional key points, the three-dimensional key points with the minimum re-projection error can be calculated by the optimization algorithm. The optimization algorithm may be, for example, the Levenberg-Marquard algorithm.

Figure 6C:
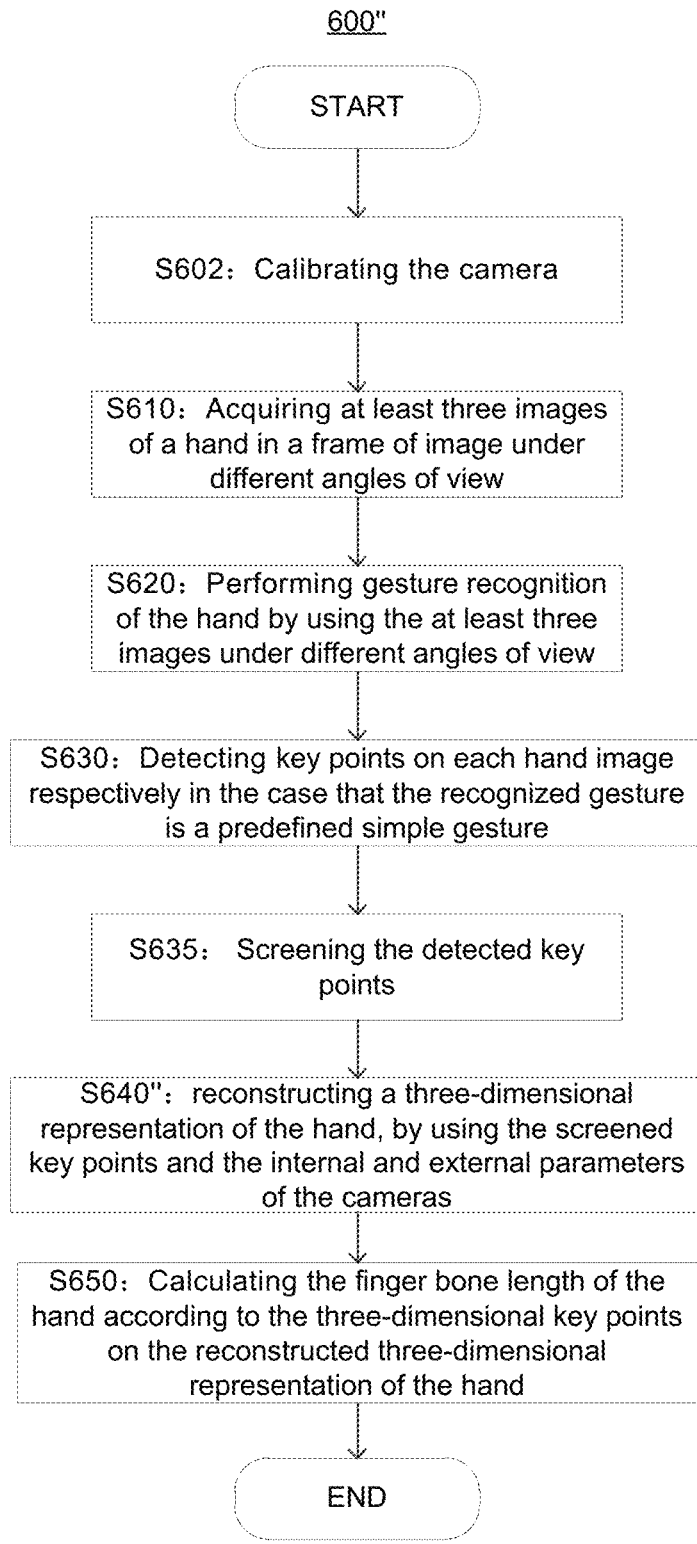
FIG. 6C schematically shows a flow chart of a method for calculating a finger bone length according to one embodiment of the present invention.

FIG. 6C illustrates a schematic diagram of a method 600" for calculating a finger bone length according to another embodiment of the present disclosure. The difference from the method 600' shown in FIG. 6B lies in that the method 600" comprises a step S602 of calibrating the camera set, calculating the internal and external parameters of the cameras. The aforesaid at least three images to be processed of the target object, i.e. the hand, under different angles of view are taken by the camera set. A step S640" in the method 600" corresponds to the step S640' of the method 600'. However, different from the step S640', the step S640" comprises calculating three-dimensional key points with the minimum re-projection error by the optimization algorithm according to the screened two-dimensional key points, in combination with the internal and external parameters of the cameras.

In one embodiment, after the three-dimensional positions of the key points of a simple gesture are obtained, the length of a finger joint can be calculated out by using a frame of image. Based on the definition of key points in the hand bones, the positions of two adjacent key points can be used to calculate a corresponding bone length in the same frame of image. Referring back to FIG. 4(b), it shows a schematic diagram of a key point of the hand and a finger bone length label according to one embodiment of the present invention. As shown in the figure, for example, the length of the first segment of the index finger (corresponding to the bone denoted by $L^1_I$ in FIG. 4(b)) can be calculated with the key point of the base of the index finger (node 0 of the index finger in FIG. 4(b)) and the first key point of the index finger (node 1 of the index finger in FIG. 4(b)).

In one embodiment, the above steps can be repeated according to multiple frames of image, and the average value of a finger bone length calculated for all frames can be used as a calibration result for the bone length. The calculated value of a set of the finger lengths can be obtained from each frame of image, and multiple results can be obtained from multiple images. At last, a final output result of the finger length can be obtained by calculation of the average value, calculation of the median and other statistical methods.

According to the embodiments of the present invention, the following operations can be included at the time of performing determination and recognition of gesture. When data is being collected, the tester makes different gestures as required and the duration of each gesture is recorded. Therefore, the gesture type can be determined according to time. For the data that does not record the corresponding relation between gesture and time. For the photos taken by different cameras at the same moment, the gesture types are detected by a neural network model, and the gesture with the largest number according to the counting are selected as the gesture of this frame. All pictures are divided into simple and difficult categories according to gestures. The 3D position of a key node can be calculated directly in a simple gesture with less coverage on the fingers and simple structure, and the bone length can be calculated according to the 3D position. At present, simple gestures include the gesture types of "five" and "grab". Other gestures are deemed difficult ones.

In traditional techniques, there may be the following several methods to calculate a finger bone length. First, according to the method of direct calculation using multiple subframes of image, the finger length is calculated using each image, and then the average value of the finger lengths in various images is counted. In this method, incorrect recognition results will have a serious impact on the accuracy of the final finger length. Even if the used image data are from simple gestures such as "five", manual screening or additional recording are still needed to obtain such data, which increases the labor cost and limits the scope of use. Second, X-ray measurement can be used to obtain accurate results of the finger lengths, but this method is not suitable for large-scale application due to its high measurement cost and low practicability. And third, the manual calibration method can also be used, whereby the positions of 2D key points in an image can be manually labelled, and then the finger length is directly calculated by using camera parameters or based on the calibration results of at least two images. However, this method has high labor costs, limited adaptable scenes, and calculation results affected by the errors in manual labelling.

According to the method for calculating a finger bone length according to the embodiment of the present invention, the bone length is measured only by a simple gesture with less coverage of gesture, and the bone length in a three-dimensional representation of the hand is directly calculated, thereby making up for various deficiencies in the existing methods.

Exemplary Calculation of Gesture Bounding Box

Figure 7A:
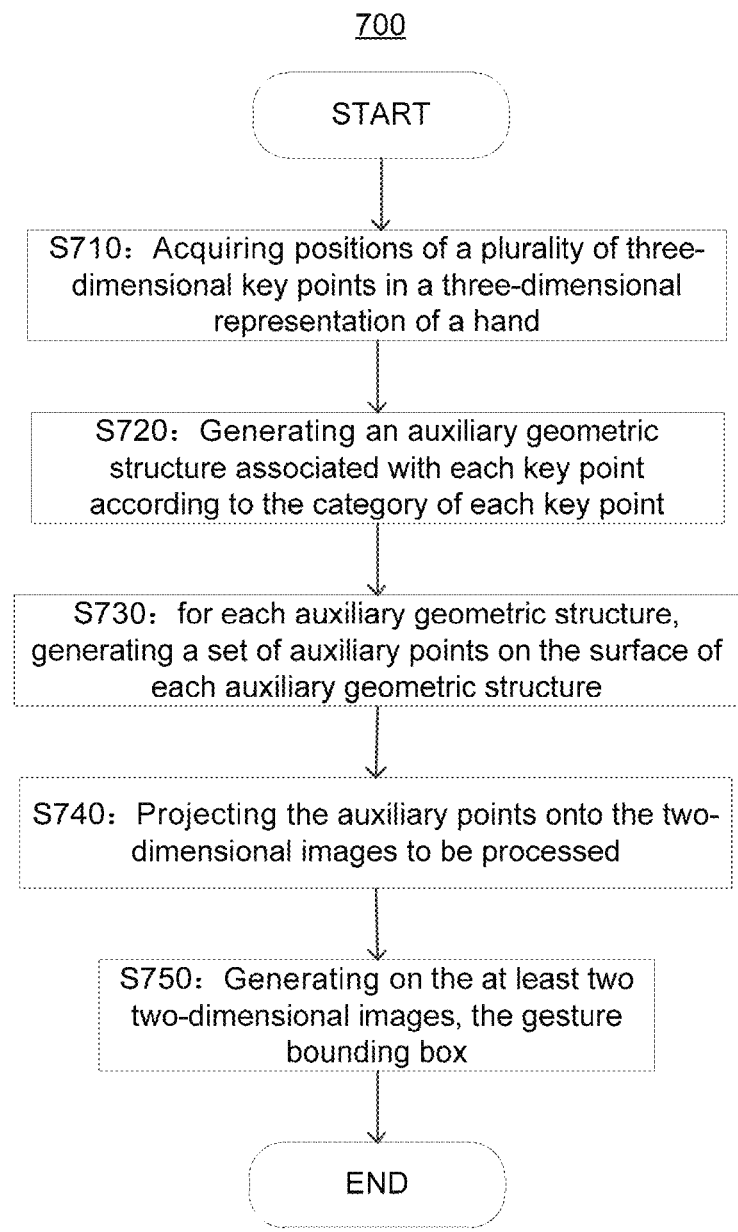
FIG. 7A schematically shows a flow chart of a method for calculating a gesture bounding box according to one embodiment of the present invention.

FIG. 7A illustrates a schematic diagram of a method 700 for calculating a gesture bounding box according to one embodiment of the present disclosure. According to the embodiment, the gesture bounding box can be calculated based on the 3D positions of key points.

In step S710, positions of a plurality of three-dimensional key points in a three-dimensional representation of a hand are acquired, and the three-dimensional representation of the hand is reconstructed according to at least two two-dimensional images of the hand;

In step S720, an auxiliary geometric structure associated with each key point is generated according to the category of each key point. For example, by taking the corresponding four key points of each finger as a sphere center, the radius is adjusted according to the thickness of the finger joint to generate four spheres of different sizes; and the wrist key points generate a corresponding ellipsoid. These auxiliary geometric structures are used to mimic the skin surface of the hand. Because the bone between the two adjacent key points of the hand is a rigid structure, a ball-and-stick model can be used to approximately represent the hand, wherein the auxiliary structure is used to approximately represent the hand joint, thus simplifying the calculation.

In step S730, for each auxiliary geometric structure, a set of auxiliary points are generated on the surface of each auxiliary geometric structure. These auxiliary points can be generated at random. The number of the auxiliary points can be arranged based on the calculation precision. Experiments show that an accurate bounding box result can have been obtained when the number of auxiliary points corresponding to one hand reaches 2000.

In step S740, the auxiliary points on the surface of the auxiliary geometric structure are projected onto the two-dimensional images to be processed.

In step S750, edge nodes at the top-most, bottom-most, leftmost and rightmost in the projection of the auxiliary points are acquired on at least two two-dimensional images, and the gesture bounding box is generated based on these four nodes. For example, on a two-dimensional image, the projection results are traversed to obtain four bounding points of the auxiliary points at the top, bottom, left and right of the hand, and further the bounding box result is generated.

In one embodiment, the method may be performed immediately after the preceding steps S540 or S540'. In one embodiment, in step S740, the key points on the three-dimensional representation of the object to be processed and the auxiliary points on the surface of the auxiliary geometric structure may be projected onto the two-dimensional images to be processed.

Figure 7B:
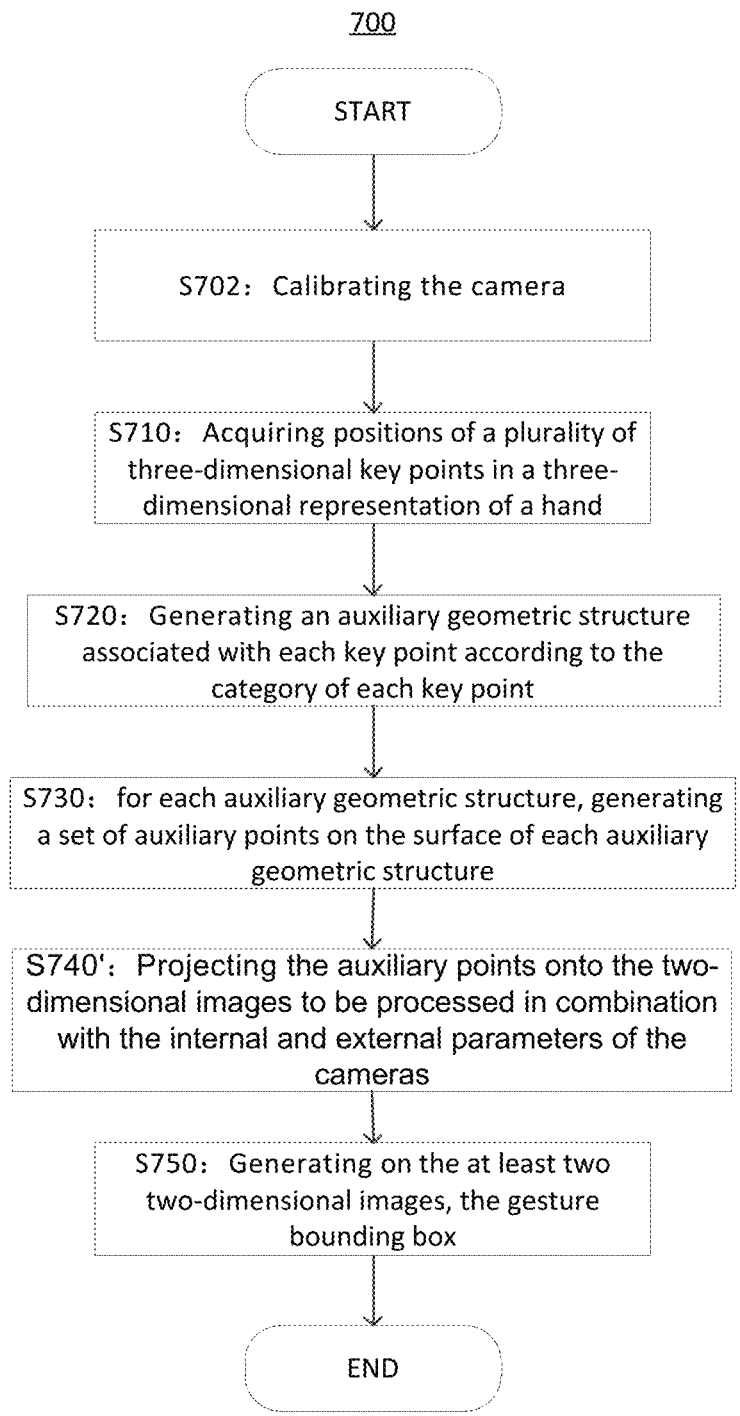
FIG. 7B schematically shows a flow chart of a method for calculating a gesture bounding box according to one embodiment of the present invention.

FIG. 7B illustrates a schematic diagram of a method 700' for calculating a gesture bounding box according to another embodiment of the present disclosure. According to the embodiment, the gesture bounding box can be calculated based on the 3D positions of key points and camera parameters. Different from the method 700 shown in FIG. 7A, the method 700' comprises a step S702 to calibrate the camera set and calculate out camera internal and external parameters. The aforesaid at least three images to be processed of the target object, i.e. the hand, under different angles of view are taken by the camera set. The step S740' in the method 700' corresponds to the step S740 of the method 700. However, different from the step S740, the step S740' comprises projecting the auxiliary points on the surface of the auxiliary geometric structure onto the two-dimensional images to be processed in combination with the internal and external parameters of the cameras.

Figure 8:
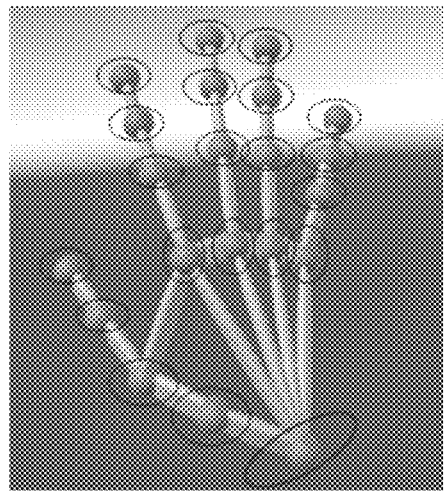
FIG. 8 schematically shows a schematic diagram of generation of an auxiliary geometric structure according to one embodiment of the present invention.
Figure 9:
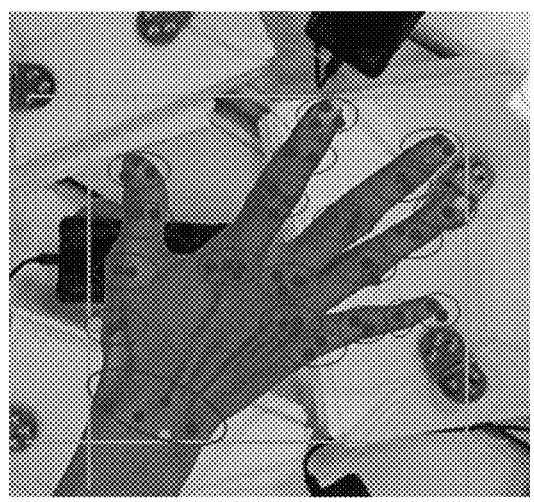
FIG. 9 schematically shows a schematic diagram of generation of a gesture bounding box according to one embodiment of the present invention.

Referring to FIG. 8, it shows a schematic diagram of generation of an auxiliary geometric structure according to one embodiment of the present invention, in which by taking each 3D key point as a sphere, the radius of the sphere is defined based on the structures of the hand at different key points to generate 21 spheres, then a set of auxiliary points randomly distributed on the surface of the sphere are generated, and the 3D coordinates of each auxiliary point are calculated based on the 3D position of the key point. Referring to FIG. 9, it shows a schematic diagram of generation of a bounding box based on the outermost four edge nodes among the projection of the auxiliary points on a two-dimensional subframe of image. As shown in FIGS. 8 and 9, after the positions of 3D key points are acquired, an auxiliary geometric structure is generated as shown by the ellipse 122 in the schematic diagram of generation of an auxiliary geometric structure, and then 3D auxiliary points are randomly generated on the surface of the auxiliary geometric structure. The 2D projection positions of these 3D auxiliary points on each two-dimensional image can be calculated based on the camera parameters. FIG. 9 displays projection points 123 and 124 of these 3D auxiliary points on a two-dimensional image, such as the red nodes and blue nodes in the figure. By traversing these nodes, it can be found that the blue nodes 124 are the bounding points in the upward, downward, left and right directions. Based on the four points a blue bounding box 125 can be generated as shown in the figure, i.e. a gesture bounding box.

According to the embodiments of the present invention, one or more of the following advantages are provided:

(1) a large amount of data can be rapidly generated. For example, under the current arrangement, 20 cameras with a 30 FPS recording speed can be used to generate 20*30=600 pictures per second, and to generate 360,000 pictures in ten minutes.

(2) data can be labelled automatically.

(3) data in a complex environment and under the case of coverage can be labelled.

(4) hand images and labeled data under the first-person angle of view can be generated.

Camera Calibration

Camera calibration technology is widely applied in the field of computer vision such as three-dimensional modeling. In the process of image measurement and in the application of machine vision, it is necessary to establish geometric models for camera imaging in order to determine the association relation or mutual relation between the three-dimensional geometric position of a point on the surface of a space object and its corresponding points in the image, and the parameters of these geometric model are the camera parameters. Under most conditions, these parameters can be obtained only by experiment and calculation, and the process of obtaining parameters (camera internal and external parameters) is called camera calibration. At present, the calibration methods mentioned in the literature include direct liner transformation (DLT), radial alignment constraint (RAC), plane target calibration method, etc., among which the method used most is Zhang Zhengyou's plane target calibration method. There are many pieces of literature about the camera calibration and the calculation of camera internal and external parameters, and reference can be made to, for example, Chinese patented documents Pub. Nos. CN109003309A, CN107993266A, CN109615661A, CN106600648A, etc.

Supposed that C cameras are used in the aforesaid image labelling system according to the embodiment of the present invention to shoot the target object under different angles of view, the various parameters of these cameras are defined and calculated in the following symbols.

A. Camera internal parameters are the parameters related to the characteristics of a camera itself, such as focal length and pixel size. For example, there are C cameras in total, and the camera internal parameter K of the i-th camera can be expressed by the following internal parameter matrix:

$$K_i = \begin{bmatrix} \alpha_x & 0 & c_x \\ 0 & \alpha_y & c_y \\ 0 & 0 & 1 \end{bmatrix},$$

where $\alpha_x$ is the focal length taking pixel as a unit in the x-axis direction of the camera, $\alpha_y$ is the focal length taking pixel as a unit in the y-axis direction of the camera, $\alpha_x$ and $c_y$ are the pixel coordinates in the image space corresponding to the projection center.

B. Camera external parameters refer to the position and pose of the camera in space. The camera external parameter $T_i$ of the i-th camera can be expressed by the following 4×4 matrix:

$$T_i = \begin{bmatrix} R_i & t_i \\ 0^T & 1 \end{bmatrix},$$

where $R_i$ is a 3×3 matrix in a special orthogonal group SO(3), which is the rotation matrix of the i-th camera to describe the rotation pose of the i-th camera. $t_i \in R^3$ is a three-dimensional vector that represents the spatial position of the i-th camera. $T_i$ fully describes the position and direction of the camera in space, namely, the external parameters of the camera. For the convenience of description and calculation, $T_i$ can be expressed using Lie-algebra $\xi_i$ equivalently, namely, expressed by the following formula: $\xi_i = [\rho^T \; \phi^T] = [\rho_1 \; \rho_2 \; \rho_3 \; \phi_1 \; \phi_2 \; \phi_3]^T$, where $\rho = [\rho_1 \; \rho_2 \; \rho_3]^T \in R^3$, and $\phi = [\phi_1 \; \phi_2 \; \phi_3]^T \in so(3)$. According to the exponential mapping on the special Euclidean group SE(3), the relation between $T_i$ and $\xi_i$ is calculated by the following formula:

$$T_i = \exp(\xi_i^\wedge) = \begin{bmatrix} \exp(\phi^\wedge) & J\rho \\ 0 & 1 \end{bmatrix}, \text{ where}$$

$$\exp(\phi^\wedge) = \exp(\theta a^\wedge) = \cos\theta I_{3\times 3} + (1-\cos\theta)aa^T + \sin\theta a^\wedge,$$

$$J = \frac{\sin\theta}{\theta}I_{3\times 3} + \left(1 - \frac{\sin\theta}{\theta}\right)aa^T + \frac{(1-\cos\theta)}{\theta}a^T, \text{ where}$$

$$\theta = \|\phi\|, a = \frac{\phi}{\theta} = [a_1 \; a_2 \; a_3], \text{ and } a^\wedge = \begin{bmatrix} 0 & -a_3 & a_2 \\ a_3 & 0 & -a_1 \\ -a_2 & a_1 & 0 \end{bmatrix}.$$

With such relation, $T_i$ and $\xi_i$ can be transformed into each other.

C. Based on the above, the external parameters of all C cameras can be summed up as follows:
$\Xi = [\xi_1, \xi_2, \ldots, \xi_i, \ldots, \xi_C]$, where $\xi_i$ corresponds to $T_i$, and $\Xi$ represents the external parameters of the cameras.

D. All three-dimensional points in all D spaces can be summed up as follows:
$P = [p_1, p_2, \ldots, p_j, \ldots, p_D]$, where $p_j = [x_j \; y_j \; z_j]^T \in R^3$ is the j-th 3D point.

Among them, the homogeneous coordinates to which $p_j = [x_j \; y_j \; z_j]^T$ corresponds is expressed by the following formula:

$$\tilde{p}_j = [x_j y_j z_j 1]^T.$$

E. The real projection point generated by the j-th point in space on the i-th camera is expressed by the following formula:
$r_{ij} = [u_{ij} \; v_{ij}]^T$, where $u_{ij}$ is the x-direction coordinate of the real two-dimensional projection point generated by the j-th point in space on the i-th camera, $v_{ij}$ is the y-direction coordinate of the real two-dimensional projection point generated by the j-th point in space on the i-th camera.

G. The projection point calculated out from the j-th point in space according to the parameters of the i-th camera is expressed by the following formula:
$q_{ij} = [w_{ij} \; s_{ij}]^T$, where $w_{ij}$ is the x-direction coordinate of the projection point calculated out from the j-th point in space according to the parameters of the i-th camera, and $v_{ij}$ is the y-direction coordinate of the real two-dimensional projection point generated by the j-th point in space on the i-th camera.

Among them, homogeneous coordinate that is used for the convenience of calculation is expressed by the following formula:

$$\tilde{q}_{ij} = [w_{ij} s_{ij} 1]^T$$

H. Accordingly, the parametric model of hand can be expressed by the following formula:

$$H(L,T,D,R,\theta) \rightarrow \text{positions of 21 key points.}$$

Figure 10:
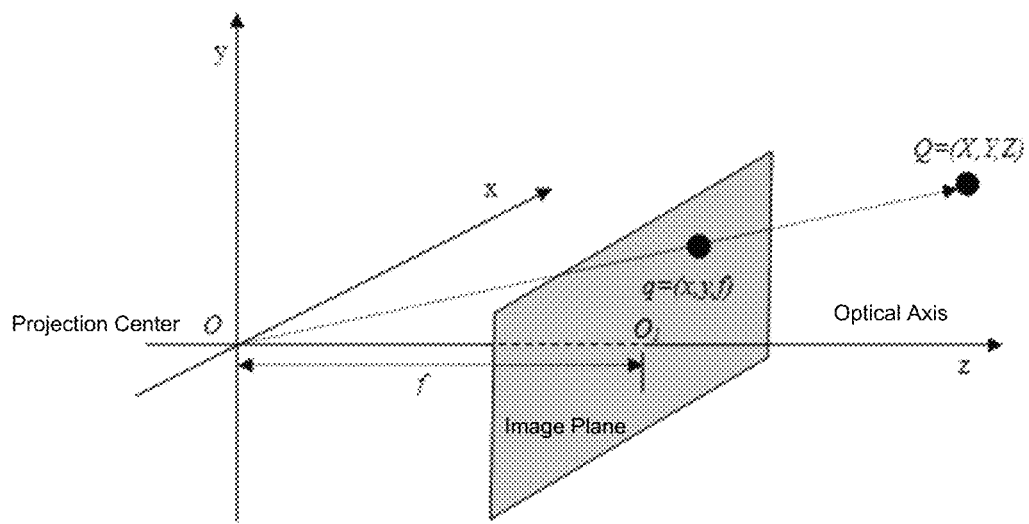
FIG. 10 schematically shows a schematic diagram of a projection model of a camera according to one example of the present invention.

Calibration of the internal parameters of a camera is to solve the internal parameter matrix of the camera, namely, to solve $a_x$, $a_y$, $c_x$ and $c_y$. FIG. 10 schematically shows a projection model of a camera.

Figure 11:
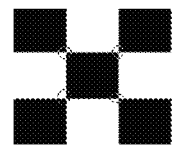
FIG. 11 schematically shows a schematic diagram of calibration of camera internal parameters according to one embodiment of the present invention.

In one embodiment, a checkerboard method is used to calibrate camera internal parameters. FIG. 11 schematically shows a schematic diagram of calibration of camera internal parameters employing the checkerboard method. As shown in FIG. 11, supposed that there are N corner points and K chessboard images (at different positions), the K chessboards can provide a constraint of 2NK, namely, the equation of 2NK. To calculate camera internal parameters, it is needed to solve 4 internal parameters and 6K external parameters (the position and angle of the K chessboards), and the equation can be solved by designing the size of N. In the implementation, a checkerboard is printed out, the length of the grids is measured, and 10 to 20 pictures are taken by the camera from different angles. The internal parameters $a_x$, $a_y$, $c_x$ and $c_y$ can be obtained by using the calibration algorithm.

It should be noted that the above only provides an exemplary method for measuring camera internal parameters, which may also be the information provided by the camera manufacturer.

Calibration of the external parameters of a camera is the process of determining the camera external parameters $\Xi = [\xi_1, \xi_2, \ldots, \xi_i, \ldots, \xi_C]$. Given the camera internal parameters, for a set of projection points $r_{ij}$ obtained by photographing the same target object with a plurality of cameras, the j-th point $p_j$ in space can be obtained according to the camera projection model, and the projection point calculated by the parameters $K_i$ and $\xi_i$ of the i-th camera, which can be expressed by the following formula:

$$\begin{bmatrix} m_{ij} \\ n_{ij} \\ v_{ij} \end{bmatrix} = K_i[I_{3\times 3} \mid 0]T_i\tilde{p}_j = \begin{bmatrix} \alpha_x & 0 & c_x \\ 0 & \alpha_y & c_y \\ 0 & 0 & 1 \end{bmatrix}\begin{bmatrix} 1 & 0 & 0 & 0 \\ 0 & 1 & 0 & 0 \\ 0 & 0 & 1 & 0 \end{bmatrix}\begin{bmatrix} R_i & t_i \\ 0^T & 1 \end{bmatrix}\begin{bmatrix} x_j \\ y_j \\ z_j \\ 1 \end{bmatrix}$$

$$q_{ij} = [w_{ij} \ s_{ij}]^T = \left[\frac{m_{ij}}{v_{ij}} \ \frac{n_{ij}}{v_{ij}}\right]^T$$

Then the error produced by each projection can be expressed by the following formula:

$$e_{ij} = e_{ij}(\xi_i, p_j) = q_{ij} - r_{ij}$$

Then, the error produced by all projections is recorded as $f$, which is a function of the camera external parameter $\Xi$ and the position P of the 3D point. Then the optimization problem about minimizing the error can be expressed by the following formula:

$$\min f(\Xi \cdot P) = \Sigma_{\substack{i=1,2,\ldots,C \\ j=1,2,\ldots,D}} E_{ij} = \Sigma_{\substack{i=1,2,\ldots,C \\ j=1,2,\ldots,D}} e_{ij}^T e_{ij}$$

In order to optimize the error function in an efficient manner, it is needed to solve the corresponding Jacobian matrix, whose results are as follows:

$$\frac{\partial e_{ij}}{\partial \delta \xi_i} = \begin{bmatrix} \frac{a_x}{z_{ij}} & 0 & -\frac{a_x x_{ij}}{z_{ij}^2} & \frac{a_x x_{ij} y_{ij}}{z_{ij}^2} & -a_x - \frac{a_x x_{ij}^2}{z_{ij}^2} & \frac{a_x y_{ij}}{z_{ij}} \\ 0 & \frac{a_x}{z_{ij}} & -\frac{a_y y_{ij}}{z_{ij}^2} & a_y + \frac{a_y y_{ij}^2}{z_{ij}^2} & \frac{a_y x_{ij} y_{ij}}{z_{ij}^2} & -\frac{a_y x_{ij}}{z_{ij}} \end{bmatrix}$$

$$\frac{\partial e_{ij}}{\partial p_j} = \begin{bmatrix} \frac{a_x}{z_{ij}} & 0 & -\frac{a_x x_{ij}}{z_{ij}^2} \\ 0 & \frac{a_x}{z_{ij}} & -\frac{a_y y_{ij}}{z_{ij}^2} \end{bmatrix} R_i$$

Subsequently, the nonlinear optimization method, such as the Levenberg-Marquard method, can be used for optimization to obtain $\Xi$, P, but the solution of $\Xi$, P contains a free variable, namely, equal scaling of the position and P of the camera, which does not affect the value of the objective function. Therefore, it is necessary to measure the distance between any two cameras or that between any two 3D points, and the solution results can be adapted to an actual system.

In one embodiment, a small ball or a black-and-white label is photographed by all cameras at the same time, thereby obtaining a set of projection points $r_{ij}$, which can be used to solve the external parameters of the camera in combination with the internal parameters. If a small ball is adopted, the distance between any two cameras need be measured. If a positioning label is used, because the size of the label is already known, equal to the distance of 3D points, the scale parameter can be eliminated, and a result consistent with the real size can be obtained.

Solution of the Projection of Three-Dimensional Spatial Points onto Image

Camera calibration will be used to calculate out the internal and external parameters of a camera, and both are the basis for mapping points in the three-dimensional space onto the image. In addition, the relation equation between 2D key points and 3D key points can be established through the camera internal and external parameters at the time of calculating the three-dimensional spatial position, which in turn can be brought into the optimization model.

Given the parameters $K_i$ and $T_i$ of the camera, the homogeneous coordinates of the j-th point $p_j = [x_j \ y_j \ z_j]^T$ in a given space can be expressed as $\tilde{p}_j = [x_j \ y_j \ z_j \ 1]^T$, which can be calculated by the following projection relations:

$$\begin{bmatrix} m_{ij} \\ n_{ij} \\ v_{ij} \end{bmatrix} = K_i[I_{3\times 3} \mid 0]T_i\tilde{p}_j = \begin{bmatrix} \alpha_x & 0 & c_x \\ 0 & \alpha_y & c_y \\ 0 & 0 & 1 \end{bmatrix}\begin{bmatrix} 1 & 0 & 0 & 0 \\ 0 & 1 & 0 & 0 \\ 0 & 0 & 1 & 0 \end{bmatrix}\begin{bmatrix} R_i & t_i \\ 0^T & 1 \end{bmatrix}\begin{bmatrix} x_j \\ y_j \\ z_j \\ 1 \end{bmatrix},$$

and then the projection coordinate on the image is obtained:

$$q_{ij} = [w_{ij} \ s_{ij}]^T = \left[\frac{m_{ij}}{v_{ij}} \ \frac{n_{ij}}{v_{ij}}\right]^T$$

Calculation of Three-Dimensional Spatial Position Using Multiple Projection Observations Given the parameters $K_i$ and $T_i$ of a camera, for a three-dimensional point $p_j$ (unknown) in space and its projection point $r_{ij}$ (known) projected onto an image through the camera, the estimated value of the three-dimensional point $p_j$ can be obtained by the optimization method. Given an initial value of $p_j$, the projection coordinate $q_{ij}$ can be obtained according to the calculation method set forth above in the section of Solution of the Projection of Three-dimensional Spatial Points onto Image.

The error produced by each projection can be expressed by the following formula:

$$e_i = e_i(\xi_i, p_j) = q_{ij} - r_{ij}.$$

Then, the error produced by all projections is recorded as $f$, which is a function of the position P of the 3D point. Then the optimization problem about minimizing the error can be expressed by the following formula:

$$\min f(P) = \Sigma_{i=1,2,\ldots,C} E_i = \Sigma_{i=1,2,\ldots,C} e_i^T e_i$$

In order to optimize the error function in an efficient manner, it is needed to solve the corresponding Jacobian matrix, whose result is as follows:

$$\frac{\partial e_{ij}}{\partial p_j} = \begin{bmatrix} \frac{a_x}{z_{ij}} & 0 & -\frac{a_x x_{ij}}{z_{ij}^2} \\ 0 & \frac{a_x}{z_{ij}} & -\frac{a_y y_{ij}}{z_{ij}^2} \end{bmatrix} R_i$$

The estimated value of $p_j$ can be obtained by using the non-linear optimization method.

Reconstruction of Three-Dimensional Representation

According to the embodiment of the present invention, the estimation of the key points of the hand is converted into the estimation of the parameters of the hand model by introducing the finger bone length. The hand parametric model can be represented by a five tuple, namely, $H(L,T,D,R,\theta)$, by which the positions of the key points of the hand in the three-dimensional space can be calculated out.

A. Parametric model of hand

The system calculates the positions of the key points of the hand in the three-dimensional space by the parametric model $H(L,T,D,R,\theta)$ of the hand. Among them:

L is a collection of hand bone lengths, including 4 lengths of each finger joint, with a total of 20 values, which can be expressed by the following formula:

$$L=\{L_F^k : k=\{0,1,2,3\}, F=\{T,I,M,R,P\}\},$$

where T is the 3D position of the wrist node, $T \in R^3$, D is the direction vector of each finger base node relative to the wrist node, with a total of 5 unit vectors, $D=\{d_T, d_I, d_M, d_R, d_P\}$, R is the three-dimensional angle and pose information of each finger, with a total of 5 rotation matrices, $R=\{R_T, R_I, R_M, R_R, R_P\}$ and $\theta$ is the parameter to express the finger bending angle (including 10 parameters with 2 parameters for each finger), among them, $\theta=\{\theta_F^k : k=\{0,1\}, F=\{T,I,M,R,P\}\}$, the letters T, I, M, R and P denote thumb, index finger, middle finger, ring finger and little finger respectively.

Under the condition of given hand parameters, the three-dimensional positions of 21 key points under the current parameters can be obtained.

Figure 12:
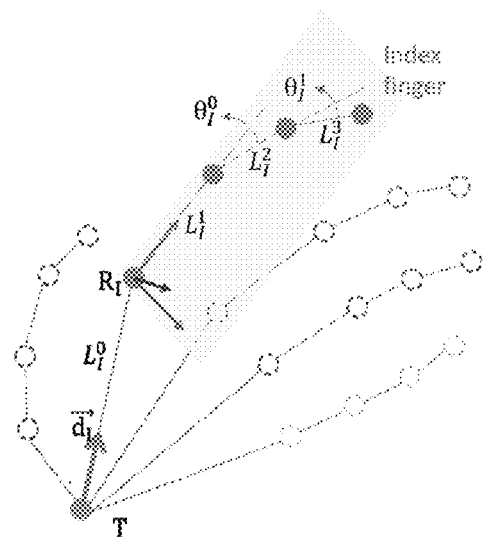
FIG. 12 schematically shows a schematic diagram of calculating positions of three-dimensional key points of a hand according to one embodiment of the present invention.

In one embodiment, as shown in FIG. 12, by taking the index finger (represented below by the subscript I) as an example, given that the wrist position T is known, the direction vector of the index finger base node corresponding to the wrist node is $\vec{d_I}$, the three-dimensional positions of the four key points of the index finger are $p_I^0, p_I^1, p_I^2, p_I^3$ respectively, the bone lengths are $L_I^0, L_I^1, L_I^2, L_I^3$, and the relevant angle parameters are $\theta_I^0, \theta_I^1$, then the parameters of the three-dimensional positions of the four key points on the index finger are represented as follows:

$$p_I^0 = T + L_I^0 \vec{d_1}$$

$$p_I^1 = p_I^0 + R_I L_I^1 [0\ 1\ 0]^T$$

$$p_I^2 = p_I^1 + R_I L_I^2 [\cos(\theta_I^0) \sin(\theta_I^0) 0]^T$$

$$p_I^3 = p_I^2 + R_I L_I^3 [\cos(\theta_I^0 + \theta_I^1) \sin(\theta_I^0 + \theta_I^1) 0]^T$$

It should be understood that the calculation method for the remaining fingers is the same as that for the index finger, and no more description will not be made.

B. Optimization method for parameters in hand model

Given the camera parameters $K_j$ and $T_j$, the hand length information L, and the screened observation value R', then T, D, R and $\theta$ can be obtained through optimization according to the hand parametric model $H(L,T,D,R,\theta)$, and the three-dimensional positions of key points can be obtained in turn.

Given a set of initial values of T, D, R and $\theta$, the three-dimensional positions of 21 key points can be obtained by using the following formula:

$$K=\{T, p_T^0, p_T^1, p_T^2, p_T^3, p_I^0, p_I^1, p_I^2, p_I^3, p_M^0, p_M^1, p_M^2, p_M^3, p_R^0, p_R^1, p_R^2, p_R^3, p_P^0, p_P^1, p_P^2, p_P^3\}$$

For $p_j \in K$ as given, the projection coordinate $q_{ij}$ can be obtained according to the calculation method set forth above in the section of Solution of the Projection of Three-dimensional Spatial Points onto Image.

The error produced by each projection can be expressed by the following formula:

$$e_{ij} = e_{ij}(\xi_i; p_j) = q_{ij} - r_{ij}$$

then, the optimization problem can be expressed as follows:

$$\min f(T, D, R, \theta) = \sum_{\{i,j: r_{ij} \in R'\}} E_{ij} = \sum_{\{i,j: r_{ij} \in R'\}} e_{ij}^T e_{ij},$$

the optimization variables are T, D, R and $\theta$, and $f(T,D,R,\theta)$ is a continuous function of T, D, R and $\theta$, so the nonlinear optimization problem can be used for solution. By bringing the solved parameters into the hand model H, the three-dimensional positions K of the final 21 key points can be obtained. According to the K, the projection points on the image can be obtained according to the calculation method set forth above in the section of Solution of the Projection of Three-dimensional Spatial Points onto Image.

RANSAC Algorithm Framework

For a plurality of sub images, under different angles of view, of a frame of image, RANSAC algorithm can be used to screen out a subset to eliminate the influence of the data with large error. In one embodiment, for the observation of a three-dimensional point $p_j$ in different cameras, the method of screening key points by using RANSAC algorithm may comprise iteratively performing the following step sequences A1, A2 and A3 by a preset iteration number n:

In step A1, s cameras are randomly selected from all cameras as a set S, while other cameras as a set U, and the projection points corresponding to S in a projection point set R are selected, $R'_j = \{r_{ij} : r_{ij} \in R_j, i \in S\}$. According to the method set forth above in the section of Calculation of Three-Dimensional Spatial Position Using Multiple Projection Observations, an estimated value $p'_j$ of $p_j$ is calculated out using $R'_j$. An initialization result set F is an empty set.

In step A2, for each camera u in the other camera set U, the estimated value $p'_j$ is projected onto the image taken by the camera u to obtain a projection $q_{uj}$ according to the method set forth above in the section of Reconstruction of Three-dimensional Representation. $r_{uj}$ is the position of the j-th key point on the image collected by the camera u. If it is satisfied that the distance between $q_{uj}$ and $r_{uj}$ is less than the preset error threshold $\sigma$, then the camera u is classified into the camera set S.

In step A3, if the number of elements in the camera set S is greater than that in the set F, then the value of S is assigned to F.

After completion of the above iterative steps, for the observation generated by the points in D spaces as an input, $R=\{R_j:0<j\leq D\}$, where $R_j=\{r_{ij}:0<i\leq C\}$ the output result, i.e. a subset of R, $R'=\{RANSAC\_SELECT(R_j):0<j\leq D\}$, can be obtained as the input at the time of optimization of hand model parameters.

In the implementation, there are 21 key points on the hand, then D=21, and when the number of cameras C=20, the set R contains 420 two-dimensional observations. For the 20 observations generated by each key point, some ($\geq n$), such as 10 on average, can be selected from them as a credible observation by employing RANSAC algorithm framework, and all of the screened observation values, about 210 observations, are used as the input at the time of optimization of hand model parameters.

Second Aspect

Figure 13:
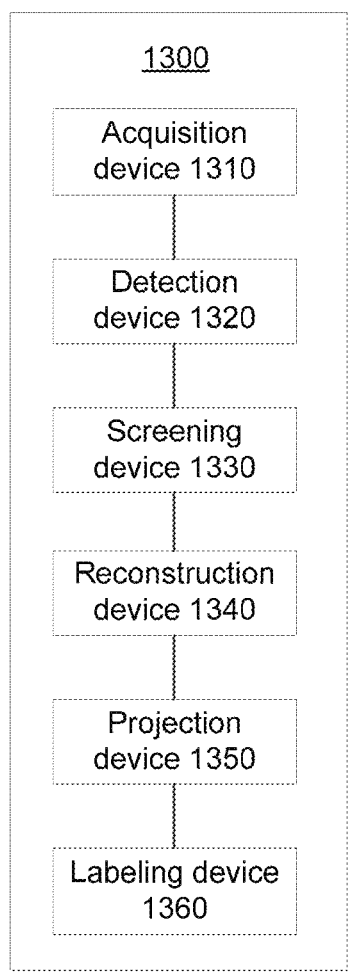
FIG. 13 illustrates a block diagram of a device for automatically generating labeled data according to one embodiment of the present invention.

FIG. 13 illustrates a block diagram of a device 1300 for automatically generating labeled data according to one embodiment of the present invention. The device 1300 comprises:

an acquisition device 1310 for acquiring at least three images to be processed under different angles of view for a hand;

a detection device 1320 for detecting key points on the at least three images to be processed respectively;

a screening device 1330 for screening the detected key points by using an association relation among the at least three images to be processed, the association relation being the fact that the at least three images to be processed are from the same frame of image of the hand under different angles of view;

a reconstruction device 1340, which reconstructs a three-dimensional space representation of the hand with regard to the key points screened on the same frame of image, in combination with a given finger bone length;

a projection device 1350 for projecting the key points on the three-dimensional representation of the hand onto the at least three images to be processed; and a labeling device 1360 for generating the labeled data of the hand on the images to be processed by using the projected key points on the at least three images to be processed.

It should be understood that each module recorded in the device 1300 corresponds to each step in the method 500 described with reference to FIG. 5A and the method 500' described with reference to FIG. 5C. Thus, the operations and features described above for the methods 500 and 500' are also applicable to the device 1300 and the devices or modules contained therein. For the sake of brevity, the similar contents will not be repeated here.

Figure 14:
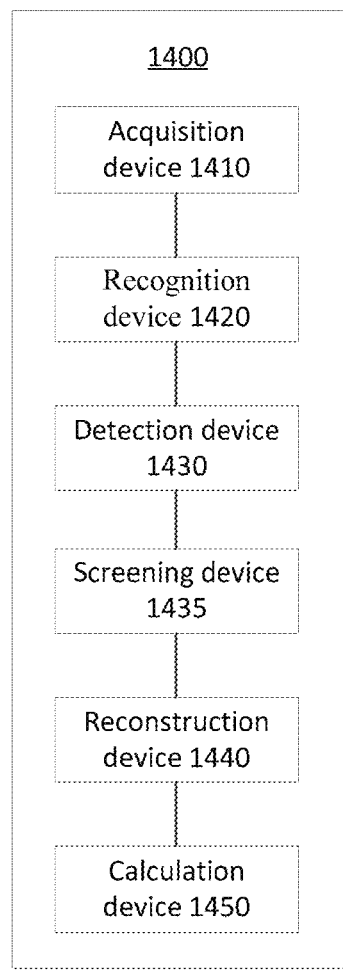
FIG. 14 schematically shows a block diagram of a device for calculating a finger bone length according to one embodiment of the present invention.

FIG. 14 schematically shows a block diagram of a device 1400 for calculating a finger bone length according to one embodiment of the present invention. The device 1400 comprises:

an acquisition device 1410 for acquiring at least two images (subframe) of a hand in a frame of image under different angles of view;

a recognition device 1420 for performing gesture recognition for the hand by using the at least two images under different angles of view;

a detection device 1430 for performing detection of key points on each hand image in at least two images respectively in the case that the recognized gesture is a predefined simple gesture;

a reconstruction device 1440 for reconstructing a three-dimensional representation of the hand by using the detected key points; and a calculation device 1450 for calculating the finger bone length of the hand according to the three-dimensional key points on the reconstructed three-dimensional representation of the hand.

Further, when the at least two images are at least three images, the device 1400 may further comprise:

a screening device 1435 for screening the detected key points by using an association relation between the at least two images in the same frame of image.

It should be understood that each module recorded in the device 1400 corresponds to each step in the method 600 described with reference to FIG. 6A, the method 600' described with reference to FIG. 6B, and the method 600" described with reference to FIG. 6C. Thus, the operations and features described above for the methods 600, 600' and 600" are also applicable to the device 1400 and the devices or modules contained therein. For the sake of brevity, the similar contents will not be repeated here.

Figure 15:
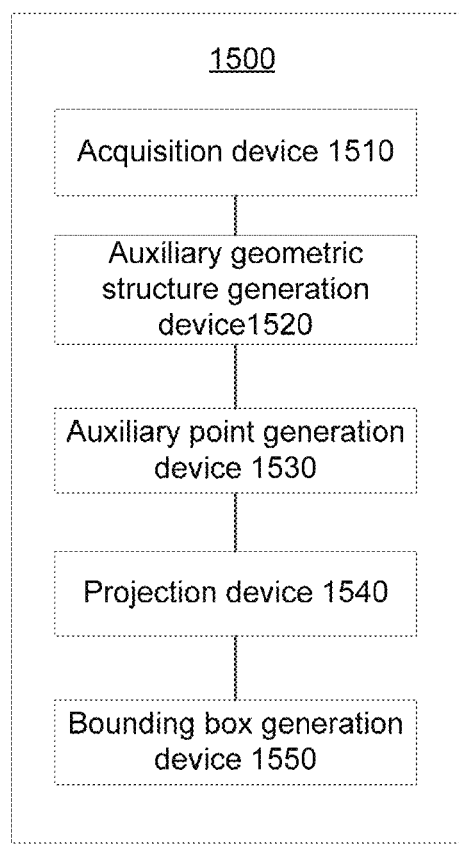
FIG. 15 schematically shows a block diagram of a device for calculating a gesture bounding box according to one embodiment of the present invention.

FIG. 15 schematically shows a block diagram of a device 1500 for calculating a gesture bounding box according to one embodiment of the present invention. The device 1500 comprises:

an acquisition device 1510 for acquiring positions of a plurality of three-dimensional key points in a three-dimensional representation of a hand, the three-dimensional representation of the hand reconstructed according to at least two two-dimensional images of the hand;

an auxiliary geometric structure generation device 1520 for generating an auxiliary geometric structure associated with each key point according to the category of each key point in the plurality of three-dimensional key points;

an auxiliary point generation device 1530 for generating for each auxiliary geometric structure a set of auxiliary points on the surface of each auxiliary geometric structure;

a projection device 1540 for projecting the auxiliary points onto the at least two two-dimensional images; and a bounding box generation device 1550 for acquiring edge nodes at the topmost, bottommost, leftmost and rightmost in the projection of the auxiliary points on the at least two two-dimensional images, and generating the gesture bounding box based on the four nodes.

It should be understood that each module recorded in the device 1500 corresponds to each step in the method 700 described with reference to FIG. 7A and the method 700' described with reference to FIG. 7B. Thus, the operations and features described above for the methods 700 and 700' are also applicable to the device 1500 and the devices or modules contained therein. For the sake of brevity, the similar contents will not be repeated here.

Third Aspect: Computer Program Products

Figure 16:
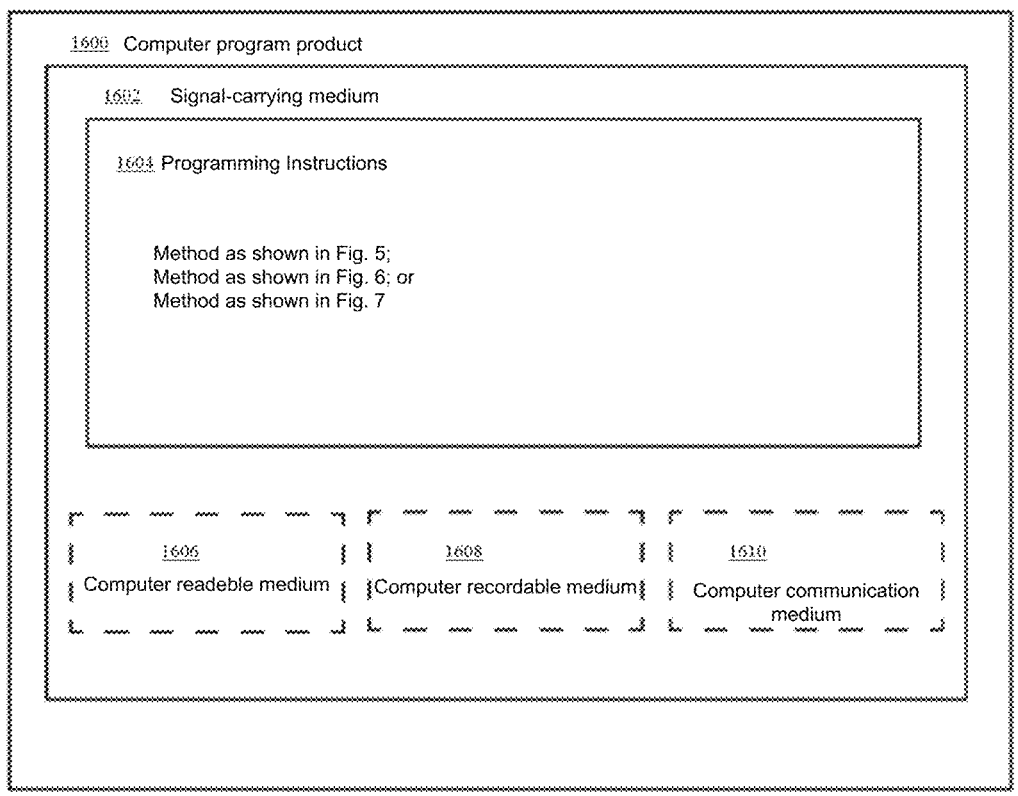
FIG. 16 schematically shows a block diagram of a computer program product according to one embodiment of the present invention.

The third aspect of the present disclosure also relates to a block diagram of a computer program product 1600, as shown in FIG. 16. A signal-carrying medium 1602 may be implemented as or include a computer-readable medium 1606, a computer-recordable medium 1608, a computer communication medium 1610, or a combination thereof, which stores all or some programming instructions 1604 in the previously described process, executed by a configurable processor. These instructions may include, for example, one or more executable instructions for causing one or more processors to perform the following processing. These executable instructions may be, for example, the steps in the aforesaid methods.

It should be understood that the various exemplary methods and devices described above may be implemented at a server or customer terminal equipment, which may be done in various ways. For example, in some embodiments, the various devices described above may be implemented by software and/or firmware modules, or by hardware modules. Other ways known at present or developed in the future are also feasible, and the scope of the present invention is not limited in this respect.

Figure 17:
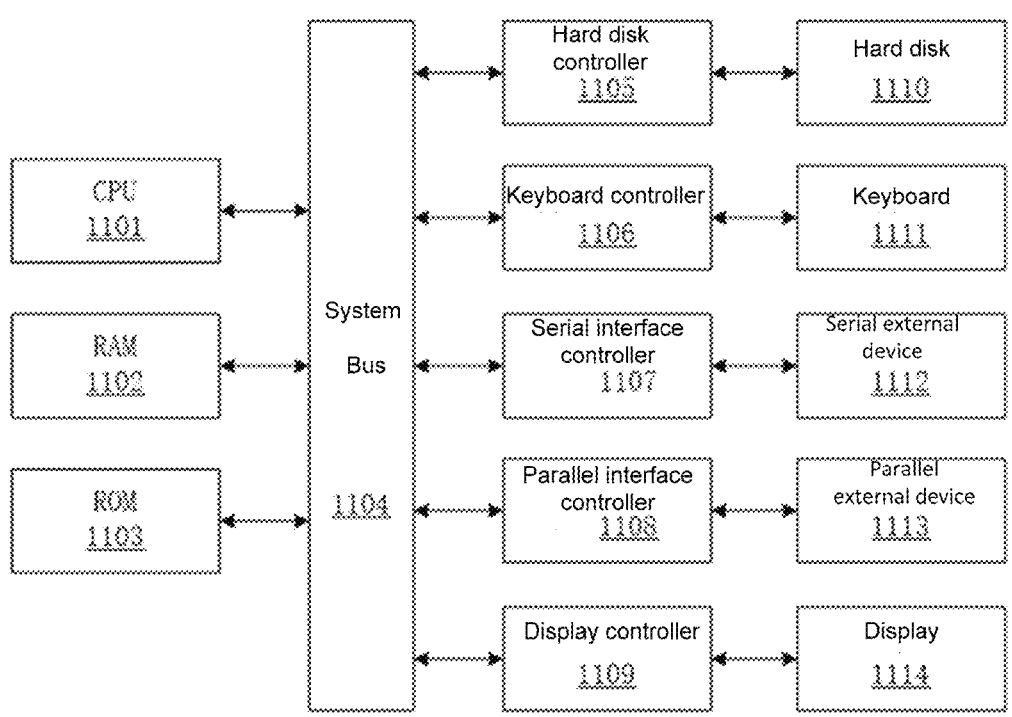
FIG. 17 schematically shows a block diagram of a computer system suitable for implementing the embodiments of the present invention according to one embodiment of the invention.

FIG. 17 shows a block diagram of a computer system suitable for implementing the embodiments of the present invention. As shown in FIG. 17, the computer system may comprise: a CPU (central processing unit) 1101, a RAM (random access memory) 1102, a ROM (read only memory) 1103, a system bus 1104, a hard disk controller 1105, a keyboard controller 1106, a serial interface controller 1107, a parallel interface controller 1108, a display controller 1109, a hard disk 1110, a keyboard 1111, a serial external device 1112, a parallel external device 1113 and a display 1114. Among these components, the CPU 1101, the RAM 1102, the ROM 1103, the hard disk controller 1105, the keyboard controller 1106, the serial controller 1107, the parallel controller 1108 and the display controller 1109 are connected with the system bus 1104. The hard disk 1110 is connected with the hard disk controller 1105, the keyboard 1111 is connected with the keyboard controller 1106, the serial external device 1112 is connected with the serial interface controller 1107, the parallel external device 1113 is connected with the parallel interface controller 1108, and the display 1114 is connected with the display controller 1109. It should be understood that the structural block diagram in FIG. 5 is shown for the illustrative purpose only, not for limiting the present invention. In some cases, some of these devices may be added or reduced to meet needs.

In particular, in addition to the implementation by hardware, the embodiments of the present invention can be achieved in the form of a computer program product. For example, the method 200 described with reference to FIG. 2 may be implemented by a computer program product. The computer program product can be stored in the RAM, ROM, hard disk and/or any suitable storage medium, or downloaded to the computer system from an appropriate site through network. The computer program product may comprise a computer code portion comprising program instructions executable by an appropriate processing device.

The foregoing contents can be better understood according to the following clauses:

Clause 1: an image labelling system, comprising:

a support framework, the support framework being a polyhedral structure constructed by a plurality of support boards;

at least two cameras mounted on at least two support boards of the plurality of support boards of the support framework; and a labeling device configured to receive two or more images to be processed taken by the at least two cameras, and to label the hand in the image data to be processed.

Clause 2: the image labelling system according to Clause 1, wherein the support framework is a regular icosahedron structure constructed by twenty regular-triangle support boards, and the vertices of some of the twenty triangular support boards are prepared with an open notch.

Clause 3: the image labelling system according to Clause 1 or 2, wherein the central region of the support board is provided with a mounting hole set for mounting the cameras.

Clause 4: the image labelling system according to Clause 1 or 2, wherein the edge region of the support board is provided with a splicing hole set for fixing the adjacent support boards of the support framework.

Clause 5: the image labelling system according to Clause 1 or 2, wherein the support board is made of a transparent material.

Clause 6: the image labelling system according to Clause 1 or 2, wherein the shape of the support board among the plurality of support boards includes a regular triangle, a square or other polygon.

Clause 7: the image labelling system according to Clause 1 or 2, wherein the side edges of the support board among the plurality of support boards are prepared with an open notch.

Clause 8: the image labelling system according to Clause 1 or 2, wherein the labelling includes one or more of the following items: recognizing a bounding box of the hand from the two or more images to be processed; recognizing two-dimensional key points of the hand from the two or more images to be processed; recognizing three-dimensional key points of the hand from the two or more images to be processed; recognizing a gesture of the hand from the two or more images to be processed; recognizing a pose of a specific part of the hand from the two or more images to be processed; and recognizing a finger bone length of the hand part from the two or more images to be processed.

Clause 9: the image labelling system according to Clause 1 or 2, wherein the labelling device is further configured to instruct a tester to make different gestures, wherein the hand of the tester is located in the support framework.

Clause 10: the image labelling system according to Clause 1 or 2, wherein the labelling device is further configured to recognize images belonging to the same frame of image among the two or more images to be processed.

Clause 11: the image labelling system according to Clause 1 or 2, further comprising: a control center configured to control shutters of the at least two cameras to start simultaneously.

Clause 12: the image labelling system according to Clause 1 or 2, further comprising: environmental control equipment to control the environment outside the support framework.

Clause 13: the image labelling system according to Clause 1 or 2, further comprising: a mobile platform configured to support the support framework and be movable carrying the support framework.

Clause 1': a method for automatically generating labeled data of a hand, comprising: acquiring at least three images to be processed of the hand under different angles of view; detecting key points on the at least three images to be processed respectively; screening the detected key points by using an association relation among the at least three images to be processed, the association relation being the same frame of image of the at least three images to be processed from the hand under different angles of view; reconstructing a three-dimensional space representation of the hand with regard to the key points screened on the same frame of image, in combination with a given finger bone length; projecting the key points on the three-dimensional representation of the hand onto the at least three images to be processed; and generating the labeled data of the hand on the images to be processed by using the projected key points on the at least three images to be processed.

Clause 2': the method according to Clause 1', wherein the at least three images to be processed are taken by a camera set, and the method further comprises:

calibrating the camera set and solving camera internal and external parameters of the camera set;

Clause 3': the method according to Clause 2', wherein the step of reconstructing a three-dimensional space representation of the hand further comprises:

reconstructing the three-dimensional space representation of the hand with regard to the screened key points on the same frame of image, in combination with the given finger bone length, and the camera internal and external parameters of the camera set.

Clause 4': the method according to any one of Clauses 1' to 3', wherein screening the detected key points further comprises: screening the detected key points by using RANSAC algorithm.

Clause 5': the method according to any one of Clauses 1' to 3', wherein the three-dimensional space representation of the hand is based on a ball-and-stick model.

Clause 6': the method according to any one of Clause 1' to 3', wherein the labeled data includes one or more of the following items: a bounding box of the hand; a two-dimensional key point of the hand; a three-dimensional key point of the hand; a gesture of the hand; a pose of a specific part of the hand; and a finger bone length of the hand.

Clause 7': the method according to any one of Clauses 1' to 3', further comprising: instructing a tester to make different gestures.

Clause 8': the method according to any one of Clauses 1' to 3', further comprising a calculation method for the finger bone length as follows:

acquiring at least two images of the hand in a frame of image under different angles of view;

performing gesture recognition for the hand by using the at least two images under different angles of view;

performing detection of key points on each hand image in at least two images respectively in the case that the recognized gesture is a predefined simple gesture;

reconstructing a three-dimensional representation of the hand by using the detected key points; and calculating the finger bone length of the hand according to the three-dimensional key points on the reconstructed three-dimensional representation of the hand.

Clause 9': the method according to Clause 8', wherein after the step of performing detection of key points on each hand image in at least three images respectively, the calculation method for the finger bone length further comprises:

screening the detected key points by using the association relation among the at least three images in the same frame of image, wherein the steps of reconstructing the three-dimensional representation of the hand by using the detected key points comprises:

reconstructing the three-dimensional representation of the hand by using the screened key points.

Clause 10': the method according to Clause 9', wherein the at least three images are taken by a camera set, and the step of reconstructing the three-dimensional representation of the hand by using the screened key points further comprises: reconstructing the three-dimensional representation of the hand by using the screened key points, in combination with the internal and external parameters of the camera set of the camera set.

Clause 11': the method according to Clause 10', wherein screening the detected key points further comprises: screening the detected key points by using RANSAC algorithm.

Clause 12': the method according to Clause 8', wherein the simple gesture includes "five" gesture and "grab" gesture.

Clause 13': the method according to any one of Clause 1' to 3', wherein the labeled data of the hand on the images to be processed is a bounding box generated for the hand, specifically comprising:

acquiring positions of a plurality of three-dimensional key points in the three-dimensional representation of the hand, the three-dimensional representation of the hand reconstructed according to at least two two-dimensional images of the hand;

generating an auxiliary geometric structure associated with each key point according to the category of each key point in the plurality of three-dimensional key points;

generating for each auxiliary geometric structure a set of auxiliary points on the surface of each auxiliary geometric structure;

projecting the auxiliary points onto the at least two two-dimensional images; and acquiring edge nodes at the top, bottom, leftmost and rightmost in the projection of the auxiliary points on the at least two two-dimensional images, and generating the gesture bounding box based on the four nodes.

Clause 14': the method according to Clause 13', wherein the step of projecting the auxiliary points onto the at least two two-dimensional images further comprises: calculating projection positions of the auxiliary points on the at least two two-dimensional images in combination with the internal and external parameters of the camera set, wherein the at least two images are taken by the camera set.

Clause 15': the method according to Clause 13', wherein the step of projecting the auxiliary points onto the at least two two-dimensional images further comprises: projecting the plurality of three-dimensional key points in the three-dimensional representation of the hand together with the auxiliary points onto the at least two two-dimensional images.

Clause 16': the method according to Clause 13', wherein the key points correspond to joints of the hand.

Clause 17': a device for automatically generating labeled data of a hand, comprising:

an acquisition device for acquiring at least three images to be processed under different angles of view for a hand;

a detection device for detecting key points on the at least three images to be processed respectively;

a screening device for screening the detected key points by using an association relation among the at least three images to be processed, the association relation being the same frame of image of the at least three images to be processed from the hand under different angles of view;

a reconstruction device reconstructing a three-dimensional space representation of the hand with regard to the key points screened on the same frame of image, in combination with a given finger bone length;

a projection device for projecting the key points on the three-dimensional representation of the hand onto the at least three images to be processed; and a labeling device for generating the labeled data of the hand on the images to be processed by using the projected key points on the at least three images to be processed.

Clause 18': the device according to Clause 17', wherein the at least three images to be processed are taken by a camera set, and the device further comprises:

a calibration device for calibrating the camera set and solving camera internal and external parameters of the camera set.

Clause 19': the device according to Clause 18', wherein the reconstruction device is further used for reconstructing the three-dimensional space representation of the hand with regard to the screened key points on the same frame of image, in combination with the given finger bone length, and the camera internal and external parameters of the camera set.

Clause 20': the device according to any one of Clauses 17' to 19', wherein the screening device is further used for screening the detected key points by using RANSAC algorithm.

Clause 21': the device according to any one of Clauses 17' to 19', wherein the labeled data includes one or more of the following items: a bounding box of the hand; a two-dimensional key point of the hand; a three-dimensional key point of the hand; a gesture of the hand; a pose of a specific part of the hand; and a finger bone length of the hand Clause 22': a system for automatically generating labeled data of a hand, comprising: an image capture system comprising a camera set configured to acquire at least three images to be processed for the hand under different angles of view; and a labeling device configured to carry out the following operations: detecting key points on the at least three images to be processed respectively; screening the detected key points by using an association relation among the at least three images to be processed, the association relation being the same frame of image of the at least three images to be processed from the hand under different angles of view; reconstructing a three-dimensional space representation of the hand with regard to the key points screened on the same frame of image, in combination with a given finger bone length; projecting the key points on the three-dimensional representation of the hand onto the at least three images to be processed; and generating the labeled data of the hand on the images to be processed by using the projected key points on the at least three images to be processed.

Clause 23': the system according to Clause 22', wherein the at least three images to be processed are taken by a camera set, and the labeling device is further configured to carry out the following operation:

calibrating the camera set and solving camera internal and external parameters of the camera set;

Clause 24': the system according to Clause 23', wherein the operation of reconstructing the three-dimensional space representation of the hand further comprises:

reconstructing the three-dimensional space representation of the hand with regard to the screened key points on the same frame of image, in combination with the given finger bone length, and the camera internal and external parameters of the camera set.

Clause 25': the system according to any one of Clauses 22' to 24', wherein the operation of screening the detected key points further comprises: screening the detected key points by using RANSAC algorithm.

Clause 26': the system according to any one of Clauses 22' to 24', further comprising:

a control center configured to control shutters of the at least two cameras to start simultaneously.

Clause 27': the system according to any one of Clauses 22' to 24', further comprising:

environmental control equipment controlling the environment outside the support framework.

Clause 28': a computer-readable storage medium, comprising computer-executable instructions stored thereon, the executable instructions implementing the method of labelling data according to any one of Clauses 1' to 16' when executed by a processor.

Clause 29': a method for calculating a finger bone length, comprising:

acquiring at least two images of a hand in a frame of image under different angles of view;

performing gesture recognition for the hand by using the at least two images under different angles of view;

performing detection of key points on each hand image in at least two images respectively in the case that the recognized gesture is a predefined simple gesture;

reconstructing a three-dimensional representation of the hand by using the detected key points; and calculating the finger bone length of the hand according to the three-dimensional key points on the reconstructed three-dimensional representation of the hand.

Clause 30': the method according to Clause 29', wherein the at least two images are at least three images, and after the step of performing detection of key points on each hand image in at least two images respectively, the method further comprises:

screening the detected key points by using an association relation among the at least three images in the same frame of image.

wherein the step of reconstructing the three-dimensional representation of the hand by using the detected key points comprises:

reconstructing the three-dimensional representation of the hand by using the screened key points.

Clause 31': the method according to Clause 30', wherein the at least three images are taken by a camera set, and the step of reconstructing the three-dimensional representation of the hand by using the screened key points further comprises: reconstructing the three-dimensional representation of the hand by using the screened key points, in combination with the internal and external parameters of the camera set of the camera set.

Clause 32': the method according to Clause 31', wherein the step of screening the detected key points further comprises: screening the detected key points by using RANSAC algorithm.

Clause 33': the method according to any one of Clauses 29' to 32', wherein the simple gesture includes "five" gesture and "grab" gesture.

Clause 34': a device for calculating a finger bone length, comprising:

an acquisition device for acquiring at least two images of a hand in a frame of image under different angles of view;

a recognition device for performing gesture recognition for the hand by using the at least two images under different angles of view;

a detection device for performing detection of key points on each hand image in at least two images respectively in the case that the recognized gesture is a predefined simple gesture;

a reconstruction device for reconstructing a three-dimensional representation of the hand by using the detected key points; and a calculation device for calculating the finger bone length of the hand according to the three-dimensional key points on the reconstructed three-dimensional representation of the hand.

Clause 35': the device according to Clause 34', wherein the at least two images are at least three images, and the device further comprises:

a screening device for screening the detected key points by using an association relation among the at least three images in the same frame of image; wherein the reconstruction device is used for reconstructing a three-dimensional representation of the hand by using the screened key points.

Clause 36': a system for calculating a finger bone length, comprising:

an image capture system comprising a camera set configured to acquire at least two images of a hand in a frame of image under different angles of view; and a finger bone length calculation device configured to carry out the following operations:

performing gesture recognition for the hand by using the at least two images under different angles of view;

performing detection of key points on each hand image in at least two images respectively in the case that the recognized gesture is a predefined simple gesture;

reconstructing a three-dimensional representation of the hand by using the detected key points; and calculating the finger bone length of the hand according to the three-dimensional key points on the reconstructed three-dimensional representation of the hand Clause 37': the system according to Clause 36', wherein the at least two images are at least three images, and the finger bone length calculation device is further configured to perform the following operation after the step of performing detection of key points on each hand image of at least three images respectively:

screening the detected key points by using an association relation between the at least two images in the same frame of image, wherein the step of reconstructing the three-dimensional representation of the hand by using the detected key points comprises:

reconstructing the three-dimensional representation of the hand by using the screened key points.

Clause 38': a computer-readable storage medium, comprising computer-executable instructions stored thereon, the executable instructions implementing the method of calculating a finger bone length according to any one of Clauses 29' to 33' when executed by a processor.

Clause 39': a method for calculating a gesture bounding box, comprising:

acquiring positions of a plurality of three-dimensional key points in a three-dimensional representation of a hand, the three-dimensional representation of the hand reconstructed according to at least two two-dimensional images of the hand;

generating an auxiliary geometric structure associated with each key point according to the category of each key point in the plurality of three-dimensional key points; and generating for each auxiliary geometric structure a set of auxiliary points on the surface of each auxiliary geometric structure;

projecting the auxiliary points onto the at least two two-dimensional images; and acquiring edge nodes at the top, bottom, leftmost and rightmost in the projection of the auxiliary points on the at least two two-dimensional images, and generating the gesture bounding box based on the four nodes.

Clause 40': the method according to Clause 39', wherein the step of projecting the auxiliary points onto the at least two two-dimensional images further comprises:

calculating projection positions of the auxiliary points on the at least two two-dimensional images in combination with the internal and external parameters of the camera set, wherein the at least two images are taken by the camera set.

Clause 41': the method according to Clause 39', wherein the step of projecting the auxiliary points onto the at least two two-dimensional images further comprises: projecting the plurality of three-dimensional key points in the three-dimensional representation of the hand together with the auxiliary points onto the at least two two-dimensional images.

Clause 42': the method according to Clause 39' to 41', wherein the key points correspond to joints of the hand.

Clause 43': the method according to Clause 42', wherein for key points of the fingers, the corresponding auxiliary geometric structure is a sphere; and for key points of the wrist, the corresponding auxiliary geometric structure is an ellipsoid.

Clause 44': a device for calculating a gesture bounding box, comprising:

an acquisition device for acquiring positions of a plurality of three-dimensional key points in a three-dimensional representation of a hand, the three-dimensional representation of the hand reconstructed according to at least two two-dimensional images of the hand;

an auxiliary geometric structure generation device for generating an auxiliary geometric structure associated with each key point according to the category of each key point in the plurality of three-dimensional key points;

an auxiliary point generation device for generating for each auxiliary geometric structure a set of auxiliary points on the surface of each auxiliary geometric structure;

a projection device for projecting the auxiliary points onto the at least two two-dimensional images; and a bounding box generation device for acquiring edge nodes at the top, bottom, leftmost and rightmost in the projection of the auxiliary points on the at least two two-dimensional images, and generating the gesture bounding box based on the four nodes Clause 45': a system for calculating a gesture bounding box, comprising:

an image capture system comprising a camera set configured to acquire at least two images of a hand in a frame of image under different angles of view; and a gesture bounding box calculation device configured to carry out the following operations:

acquiring positions of a plurality of three-dimensional key points in a three-dimensional representation of a hand, the three-dimensional representation of the hand reconstructed according to at least two two-dimensional images;

generating an auxiliary geometric structure associated with each key point according to the category of each key point in the plurality of three-dimensional key points;

generating for each auxiliary geometric structure a set of auxiliary points on the surface of each auxiliary geometric structure;

projecting the auxiliary points onto the at least two two-dimensional images; and acquiring edge nodes at the top, bottom, leftmost and rightmost in the projection of the auxiliary points on the at least two two-dimensional images, and generating the gesture bounding box based on the four nodes.

Clause 46': a computer-readable storage medium, comprising computer-executable instructions stored thereon, the executable instructions implementing the method of calculating a gesture bounding box according to any one of Clauses 39' to 43' when executed by a processor.

It should be noted that embodiments of the present invention may be implemented by hardware, software, or a combination of software and hardware. The hardware part can be implemented by special logic; and the software part can be stored in a memory and executed by an appropriate system for instruction execution, such as a microprocessor or special design hardware. Those skilled in the art will understand that the aforesaid devices and methods may be implemented using computer executable instructions and/or contained in processor-controlled codes. For example, such codes are provided on a carrier medium such as a disk, CD or DVD-ROM, a programmable memory such as a read-only memory (firmware), or a data carrier such as an optical or electronic signal carrier. The devices and their modules according to the present invention may be implemented by hardware circuits of, for example, Very Large Scale Integration or gate array, or semiconductors such as logic chips and transistors, or programmable hardware devices such as field programmable gate arrays and programmable logic devices, or may also be implemented by software executed by various types of processors, or by a combination of the above hardware circuits and software, for example, firmware.

It should be noted that although several modules or submodules of the devices are mentioned in the Detailed Description above, such division is only not mandatory. In fact, according to the embodiments of the present invention, the features and functions of two or more modules described above can be implemented in one module. On the contrary, the features and functions of a module described above can be further divided into multiple modules to be embodied.

Although the present invention has been described with reference to the embodiments currently considered, it should be understood that the present invention is not limited to the embodiments disclosed herein. Instead, the present invention is intended to cover various modifications and equivalent arrangements within the spirit and scope of the appended claims. The scope of the following claims is consistent with the broadest interpretation so as to cover all of such modifications and equivalent structures and functions.

The contents described above are just preferable examples of the present disclosure, and are not used to limit the present disclosure. Although the detailed description of the present disclosure has been provided with reference to the foregoing examples, those skilled in the art still may make modifications to the technical solutions recorded in various examples described above, or conduct equivalent replacement of part of technical features therein. Any modification, equivalent replacement, improvement, if only within the spirit and principles set out herein, should be covered by the protection scope of the present disclosure.

We claim:

1. A method for automatically generating labeled data of a hand, comprising:
   acquiring at least three images to be processed of the hand under different angles of view, wherein the at least three images are simultaneously acquired under the different angles of view from three or more cameras fixably attached to a camera support framework to provide a frame of the images of the hand, wherein the support framework comprises a polyhedral structure constructed by a plurality of support boards, wherein the plurality of support boards are made of a transparent material, and wherein a central region of the plurality of support boards includes a mounting hole set for mounting the three or more cameras;
   detecting 2D key points on the at least three images to be processed respectively;
   screening the detected 2D key points by selecting via a consensus operation to screen among the same frame of images of the hand under the different angles of view to include key points having a higher reliability assessment value based on an association relation among the at least three images to be processed, the association relation being that the at least three images to be processed are from the same frame of image of the hand under different angles of view;
   reconstructing 3D key points as a three-dimensional space representation of the hand with regard to the 2D key points screened on the same frame of the at least three images, in combination with a given finger bone length, so as to improve the precision and accuracy of the reconstructed three-dimensional space representation of the hand;
   projecting the 3D key points on the three-dimensional representation of the hand onto the at least three images to be processed; and
   generating the labeled data of the hand on the images to be processed by using the projected 3D key points on the at least three images to be processed.

2. The method according to claim 1, wherein the at least three images to be processed are taken by a camera set comprising the three or more cameras, and the method further comprises:
   calibrating the camera set and obtaining camera internal and external parameters of the camera set, wherein the camera internal and external parameters are employed to generate at least one relation equation.

3. The method according to claim 1, further comprising: calculating the finger bone length by:
   acquiring at least two images of the hand in a frame of image under different angles of view;
   performing gesture recognition for the hand by using the at least two images under different angles of view;
   performing detection of key points on each hand image in at least two images respectively in the case that the recognized gesture is a predefined simple gesture;
   reconstructing a three-dimensional representation of the hand by using the detected key points; and
   calculating the finger bone length of the hand according to the three-dimensional key points on the reconstructed three-dimensional representation of the hand.

4. The method according to claim 3, wherein after the step of performing detection of key points on each hand image in at least three images respectively, the calculation method for the finger bone length further comprises:
   screening the detected key points by using association relation among the at least three images in the same frame of image, wherein the steps of reconstructing the three-dimensional representation of the hand by using the detected key points comprises:
   reconstructing the three-dimensional representation of the hand by using the screened key points.

5. The method according to claim 4, wherein the at least three images are taken by a camera set comprising the three or more cameras, and the step of reconstructing the three-dimensional representation of the hand by using the screened key points further comprises:
   reconstructing the three-dimensional representation of the hand by using the screened key points, in combination with the internal and external parameters of the camera set.

6. The method according to claim 1, further comprising:
   acquiring positions of a plurality of three-dimensional key points in the three-dimensional representation of the hand, the three-dimensional representation of the hand being reconstructed according to at least two two-dimensional images of the hand;
   generating an auxiliary geometric structure associated with each key point according to the category of each key point in the plurality of three-dimensional key points;
   generating for each auxiliary geometric structure a set of auxiliary points on the surface of each auxiliary geometric structure;

projecting the auxiliary points onto the at least two two-dimensional images; and acquiring edge nodes at the topmost, bottommost, leftmost and rightmost in the projection of the auxiliary points on the at least two two-dimensional images, and generating the gesture bounding box based on the four nodes.

7. The method according to claim 6, wherein the step of projecting the auxiliary points onto the at least two two-dimensional images further comprises:

calculating projection positions of the auxiliary points on the at least two two-dimensional images in combination with the internal and external parameters of the camera set, wherein the at least two images are taken by the camera set.

8. A non-transitory computer readable medium having instructions that automatically generates labeled data of a hand, wherein the instructions when executed by a processor causes the processor to execute the method according to claim 1.

9. A device for automatically generating labeled data of a hand, comprising:

an acquisition device comprising three or more cameras for acquiring at least three images to be processed under different angles of view for a hand, wherein the at least three images are simultaneously acquired under the different angles of view from the three or more cameras fixably attached to a camera support framework to provide a frame of the images of the hand, wherein the support framework comprises a polyhedral structure constructed by a plurality of support boards, wherein the plurality of support boards are made of a transparent material, and wherein a central region of the plurality of support boards includes a mounting hole set for mounting the three or more cameras;

a detection device for detecting 2D key points on the at least three images to be processed respectively;

a screening device for screening the detected 2D key points by selecting via a consensus operation to screen among the same frame of images of the hand under the different angles of view to include key points having a higher reliability assessment value based on an association relation among the at least three images to be processed, the association relation being that the at least three images to be processed are from the same frame of image of the hand under different angles of view;

a reconstruction device for reconstructing 3D key points as a three-dimensional space representation of the hand with regard to the 2D key points screened on the same frame of image, in combination with a given finger bone length, so as to improve the precision and accuracy of the reconstructed three-dimensional space representation of the hand;

a projection device for projecting the 3D key points on the three-dimensional representation of the hand onto the at least three images to be processed; and a labeling device for generating the labeled data of the hand on the images to be processed by using the projected 3D key points on the at least three images to be processed.

10. The device according to claim 9, wherein the at least three images to be processed are taken by a camera set comprising the three or more cameras, and the device further comprises:

a calibration device for calibrating the camera set and obtaining camera internal and external parameters of the camera set.

11. The device according to claim 9, further comprising a recognition device and a calculation device, wherein, the acquisition device further for acquiring at least two images of the hand in a frame of image under different angles of view;

the recognition device for performing gesture recognition for the hand by using the at least two images under different angles of view;

the detection device further for performing detection of key points on each hand image in at least two images respectively in the case that the recognized gesture is a predefined simple gesture;

the reconstruction device further for reconstructing a three-dimensional representation of the hand by using the detected key points; and the calculation device for calculating the finger bone length of the hand according to the three-dimensional key points on the reconstructed three-dimensional representation of the hand.

12. The device according to claim 11, wherein the at least two images are at least three images, and the device further comprises:

a screening device for screening the detected key points by using an association relation among the at least three images in the same frame of image; and wherein the reconstruction device is used for reconstructing the three-dimensional representation of the hand by using the screened key points.

13. The device according to claim 9, further comprising an auxiliary geometric structure generation device, an auxiliary point generation device and a bounding box generation device, wherein, the acquisition device is further configured for acquiring positions of a plurality of three-dimensional key points in the three-dimensional representation of the hand, the three-dimensional representation of the hand is reconstructed according to at least two two-dimensional images of the hand;

the auxiliary geometric structure generation device is configured for generating an auxiliary geometric structure associated with each key point according to the category of each key point in the plurality of three-dimensional key points;

the auxiliary point generation device is configured for generating for each auxiliary geometric structure a set of auxiliary points on the surface of each auxiliary geometric structure;

the projection device is further configured for projecting the auxiliary points onto the at least two two-dimensional images; and the bounding box generation device is configured for acquiring edge nodes at the topmost, bottommost, leftmost and rightmost in the projection of the auxiliary points on the at least two two-dimensional images, and generating the gesture bounding box based on the four nodes.

14. A system for automatically generating labeled data of a hand, comprising:

an image capture system comprising a camera set comprising three or more cameras configured to acquire at least three images to be processed for the hand under different angles of view, wherein the at least three images are simultaneously acquired under the different angles of view from the three or more cameras fixably attached to a camera support framework to provide a frame of the images of the hand, wherein the support framework comprises a polyhedral structure constructed by a plurality of support boards, wherein the plurality of support boards are made of a transparent material, and wherein a central region of the plurality of support boards includes a mounting hole set for mounting the three or more cameras; and a labeling device configured to carry out the following operations:

detecting 2D key points on the at least three images to be processed respectively;

screening the detected 2D key points by selecting via a consensus operation to screen among -the same frame of images of the hand under the different angles of view to include key points having a higher reliability assessment value based on an association relation among the at least three images to be processed, the association relation being that the at least three images to be processed are from the same frame of image of the hand under different angles of view;

reconstructing 3D key points as a three-dimensional space representation of the hand with regard to the 2D key points screened on the same frame of image, in combination with a given finger bone length, so as to improve the precision and accuracy of the reconstructed three-dimensional space representation of the hand;

projecting the 3D key points on the three-dimensional representation of the hand onto the at least three images to be processed; and generating the labeled data of the hand on the images to be processed by using the projected 3D key points on the at least three images to be processed.

15. The system according to claim 14, wherein the operation of reconstructing the three-dimensional representation of the hand further comprises:

reconstructing the three-dimensional space representation of the hand with regard to the screened key points on the same frame of image, in combination with the given finger bone length, and the camera internal and external parameters of the camera set.

16. The system according to claim 14, further comprising a calculation device for the finger bone length, wherein, the image capture system is further configured to acquire at least two images of the hand in a frame of image under different angles of view; and the calculation device for the finger bone length is configured to carry out the following operations:

performing gesture recognition for the hand by using the at least two images under different angles of view;

performing detection of key points on each hand image in at least two images respectively in the case that the recognized gesture is a predefined simple gesture;

reconstructing a three-dimensional representation of the hand by using the detected key points; and calculating the finger bone length of the hand according to the three-dimensional key points on the reconstructed three-dimensional representation of the hand.

17. The system according to claim 16, wherein the at least two images are at least three images, and the calculation device for the finger bone length is further configured to carry out the following operation after the step of performing detection of key points on each hand image in at least three images respectively:

screening the detected key points by using an association relation between the at least two images in the same frame of image, wherein the step of reconstructing the three-dimensional representation of the hand by using the detected key points comprises:

reconstructing the three-dimensional representation of the hand by using the screened key points.

18. The system according to claim 14, further comprising:

a calculation device for a gesture bounding box, wherein, the image capture system is further configured to acquire at least two images of the hand in a frame of image under different angles of view; and the calculation device for the gesture bounding box is configured to carry out the following operations:

acquiring positions of a plurality of three-dimensional key points in the three-dimensional representation of the hand, the three-dimensional representation of the hand is reconstructed according to at least two two-dimensional images of the hand;

generating an auxiliary geometric structure associated with each key point according to the category of each key point in the plurality of three-dimensional key points;

generating for each auxiliary geometric structure a set of auxiliary points on the surface of each auxiliary geometric structure;

projecting the auxiliary points onto the at least two two-dimensional images; and acquiring edge nodes at the topmost, bottommost, leftmost and rightmost in the projection of the auxiliary points on the at least two two-dimensional images, and generating the gesture bounding box based on the four nodes.

* * * * *